(12) United States Patent
Kobayashi

(10) Patent No.: US 8,533,501 B2
(45) Date of Patent: Sep. 10, 2013

(54) INFORMATION PROCESSING APPARATUS AND CONTROL METHOD OF INFORMATION PROCESSING APPARATUS

(75) Inventor: Ryoichi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 139 days.

(21) Appl. No.: 13/298,804

(22) Filed: Nov. 17, 2011

(65) Prior Publication Data
US 2012/0066523 A1 Mar. 15, 2012

Related U.S. Application Data

(63) Continuation of application No. PCT/JP2009/059597, filed on May 26, 2009.

(51) Int. Cl.
*G06F 1/00* (2006.01)
(52) U.S. Cl.
USPC .......................................... 713/300
(58) Field of Classification Search
None
See application file for complete search history.

(56) References Cited

U.S. PATENT DOCUMENTS

| | | | | |
|---|---|---|---|---|
| 6,694,440 | B1 * | 2/2004 | Ishibashi | 713/310 |
| 2004/0268111 | A1 * | 12/2004 | Dayan et al. | 713/2 |
| 2008/0080500 | A1 * | 4/2008 | Shimura et al. | 370/389 |
| 2009/0063878 | A1 * | 3/2009 | Schmidt et al. | 713/310 |
| 2010/0183005 | A1 * | 7/2010 | Kaneko et al. | 370/389 |

FOREIGN PATENT DOCUMENTS

| | | |
|---|---|---|
| JP | 2000-115222 | 4/2000 |
| JP | 2000-209220 | 7/2000 |
| JP | 2001-077877 | 3/2001 |
| JP | 2002-006997 | 1/2002 |
| JP | 2005-020728 | 1/2005 |
| JP | 2008-085687 | 4/2008 |

OTHER PUBLICATIONS

International Search Report for PCT/JP2009/059597 mailed Aug. 18, 2009.

\* cited by examiner

*Primary Examiner* — Thomas Lee
*Assistant Examiner* — Zhipeng Wang
(74) *Attorney, Agent, or Firm* — Staas & Halsey LLP

(57) ABSTRACT

An information processing apparatus includes a processing device configured to process data, a first line connecting device configured to be connected to the processing device, a second line connecting device configured to be connected to the processing device, a first input and output port configured to be connected to a first end device via a first line, a second input and output port configured to be connected to a second end device via a second line, a first selecting unit that includes a first terminal, and a second terminal and a third terminal, the first terminal being connected to the first line connecting device and either the second terminal or the third terminal.

9 Claims, 17 Drawing Sheets

INFORMATION PROCESSING APPARATUS AND CONTROL METHOD OF INFORMATION PROCESSING APPARATUS

CROSS-REFERENCE TO RELATED APPLICATIONS

This application is a U.S. continuation application filed under 35 USC 111a and 365c of PCT application PCT/JP2009/059597, filed on May 26, 2009. The foregoing application is hereby incorporated herein by reference.

FIELD

The embodiments discussed herein are related to an information processing apparatus and a control method of the information processing apparatus.

BACKGROUND

There is an exemplary information processing system which may be partitioned into two or more static partitioned parts. Remote power control is achieved using a modified wake-on LAN (WOL) installation. The Wake-on LAN (hereinafter, referred to as Wake-on LAN) is to enable remote, partition-part-wide start up of a shut-down information processing apparatus. Hereinafter, activation of the shut-down information processing apparatus with the Wake-on LAN is referred to as a Wake-on LAN activation. In the installation of the modified Wake-on LAN, a magic packet filter related to network interface controllers (NICs) inside the partitioned parts is modified. The magic packet filter designates a device having a function of adding the magic packet. The magic packet designates a packet for Wake-on LAN activation (hereinafter, the magic packet is designated in a similar manner thereto). By modifying the magic packet filter, the magic packet may be recognized by all nodes in the partitioned parts. The magic packets common to all nodes in the partitioned parts may be used. As a result, a remote activation through all partitioned parts is enabled.

Examples of such techniques are disclosed in Japanese Laid-open Patent Publication No. 2005-020728, Japanese Laid-open Patent Publication No. 2000-209220, and Japanese Laid-open Patent Publication No. 2008-085687.

SUMMARY

According to an aspect of the embodiment, an information processing apparatus includes a processing device configured to process data, a first line connecting device configured to be connected to the processing device, a second line connecting device configured to be connected to the processing device, a first input and output port configured to be connected to a first end device via a first line, a second input and output port configured to be connected to a second end device via a second line, a first selecting unit that includes a first terminal, a second terminal and a third terminal, the first terminal being connected to the first line connecting device and either the second terminal or the third terminal, a second selecting unit that includes a fourth terminal, a fifth terminal and a sixth terminal, the fourth terminal being connected to the first input and output port, the fifth terminal being connected to the second terminal, the fourth terminal being connected to either the fifth terminal or the sixth terminal, a third selecting unit that includes a seventh terminal, a eighth terminal and a ninth terminals, the seventh terminal being connected to the second input and output port, the eighth terminal being connected to the second line connecting device, the seventh terminal being connected to either the eighth terminal or the ninth terminal, and a switching unit that includes a tenth terminal, a eleventh terminal and a twelfth terminal, the tenth terminal being connected to the third terminal, the eleventh terminal being connected to the sixth terminal, the twelfth terminal being connected to the ninth terminal, the tenth terminal being connected to either the eleventh terminal or the twelfth terminal.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

DESCRIPTION OF EMBODIMENTS

The embodiments relate to an information processing apparatus which includes plural network interface devices and has a function of Wake-on LAN activation and a controlling method of the information processing apparatus.

In an information processing apparatus having plural line connecting devices, an activating command may be sent to any one of the line connecting devices among the plural line connecting devices. If the activating command is sent to the line connecting device to which a power source is not connected, the line connecting device may not receive the activating command. Therefore, the information processing apparatus is not activated. In order to avoid the situation, there is a method of supplying power to all the plural line connecting devices. According to the method, when the activating command is sent to any one of the line connecting devices, the line connecting device which has received the activating command may receive the activating command to thereby activate the information processing apparatus. For this, all the line connecting devices are supplied with standby electricity to thereby increase total standby electricity.

Preferred embodiments will be explained with reference to accompanying drawings.

Figure 1:
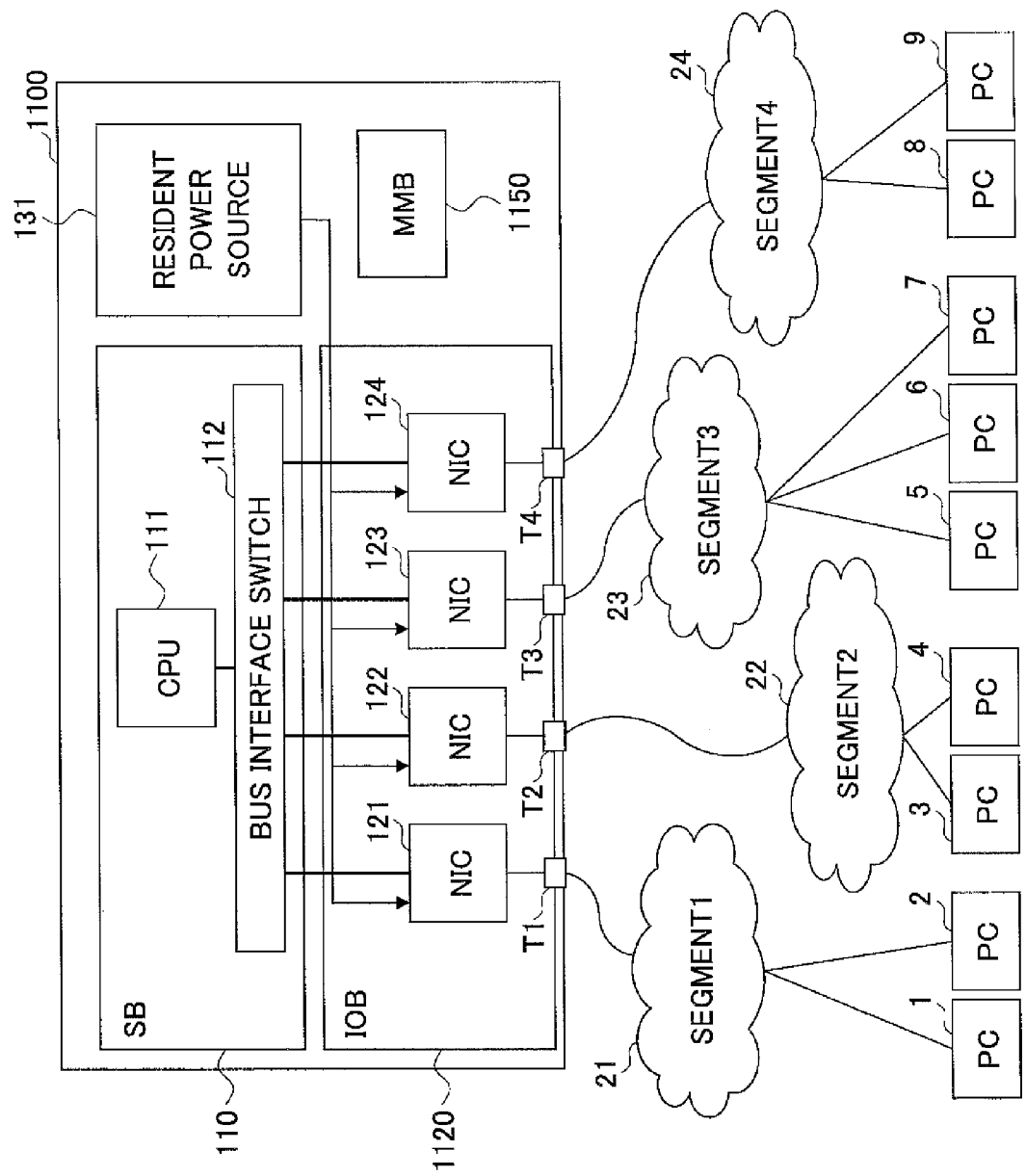
FIG. 1 is a block chart illustrating a structural example of activating PCs.

FIG. 1 illustrates a structure of an exemplary information processing apparatus. The exemplary information processing apparatus 1100 is a server including a system board 110 and an input/output (hereinafter, referred to as I/O) board 1120. The system board 110 includes a central processing unit (hereinafter, referred to as CPU) 111 and a bus interface switch 112. The CPU 111 is an arithmetic processing unit and provides an arithmetic processing function to an outside as a server. The bus interface switch connects a bus connected to the CPU 111 to buses respectively connected to NIC 121, NIC 122, NIC 123 and NIC 124 so that the buses are mutually in communication.

The information processing apparatus 1100 includes a ManageMent Board (hereinafter, referred to as MMB) 1150. The MMB 1150 is one type of a service processor (hereinafter, referred to as SVP) which manages the entire information processing apparatus 1100.

The information processing apparatus 1100 further includes a resident power source 131. The resident power source 131 constantly supplies power to NIC 121 to NIC 124 described below. Said differently, the resident power source 131 supplies the power to NIC 121, NIC 122, NIC 123 and NIC 124 during a period of time while the information processing apparatus 1100 is in an operating state and a standby state. In the operating state, the information processing apparatus 1100 functions as a server. In the standby state, the information processing apparatus 1100 does not function as the server.

The I/O board 1120 includes four onboard Network Interface Controllers (hereinafter, referred to as NIC) 121, 122, 123 and 124 as the plural network controllers. The NIC 121, NIC 122, NIC 123 and NIC 124 may respectively have functions of Wake-on LAN activation.

The information processing apparatus 1100 is connected to the personal computers 1 to 9 as plural terminal devices via the LAN. The LAN includes four segments 21, 22, 23 and 24. The information processing apparatus 1100 is connected to the personal computers 1 and 2 via the segment 1 21 and to the personal computers 3 and 4 via the segment 2 22. The information processing apparatus 1100 is connected to the personal computers 5, 6 and 7 via the segment 3 23 and to the personal computers 8 and 9 via the segment 4 24.

The NIC 121 is connected to the personal computers 1 and 2 via the segment 21. The NIC 122 is connected to the personal computers 3 and 4 via the segment 22. The NIC 123 is connected to the personal computers 5, 6 and 7 via the segment 23. The NIC 124 is connected to the personal computers 8 and 9 via the segment 24.

During the operating state in which the information processing apparatus 1100 exercises the function of the server of providing services, predetermined arithmetic processing may be requested via a corresponding segment 21 to 24 from any of the personal computers 1 to 9. In this case, the request may be transferred to the CPU 111 via the corresponding one of the NIC 121 to the NIC 124 and the bus interface switch 112. The CPU 111 provides predetermined arithmetic processing upon the request and outputs a result. The result is inversely transferred in reverse through the transferring path of the request and returned to the personal computer which has requested the predetermined arithmetic processing.

An exemplary operation of activating the Wake-on LAN in the information processing apparatus 1100 is described. The information processing apparatus 1100 is in a standby state when no arithmetic request is received from any of the personal computers 1 to 9 connected via the LAN. In the standby state, the power is supplied from the resident power source 131 to the NIC 121, the NIC 122, the NIC 123 and the NIC 124 as described above. This is to prepare for the Wake-on LAN activation.

A case where, while the information processing apparatus 1100 is in the standby state, any one of the personal computers 1 to 9, for example the personal computer 3, causes the information processing apparatus 1100 to activate with the Wake-on LAN activation is assumed. In this case, the personal computer 3 sends a so-called magic packet to the NIC 122 of the information processing apparatus 1100. The magic packet is received by the NIC 122 via the segment 2 when the information processing apparatus 1100 is activated by the Wake-on LAN activation. The NIC 122 sends a power-on signal to the MMB 1150 with the function of the Wake-on LAN activation. The MMB 1150 activates the information processing apparatus 1100 upon receipt of the power-on signal. As a result, the information processing apparatus 1100 assumes the operating state in which the information processing apparatus 1100 may exercise the functions as the server. In the operating state, the arithmetic processing is carried out by the CPU 111 in response to the requests from the personal computers 1 to 9.

As described, in the exemplary information processing apparatus 1100, the power is supplied to the NIC 121, the NIC 122, the NIC 123 and the NIC 124 (the four NICs) in the standby state. Therefore, if the magic packet is sent from any one of the personal computers 1 to 9, the corresponding NIC among the NIC 121, the NIC 122, the NIC 123 and the NIC 124 may receive the magic packet and may send the power-on signal. As the result, the Wake-on LAN activation is realized.

Next, referring to FIG. 2 to FIG. 12, the information processing apparatus 100 of First Embodiment is described.

Figure 2:
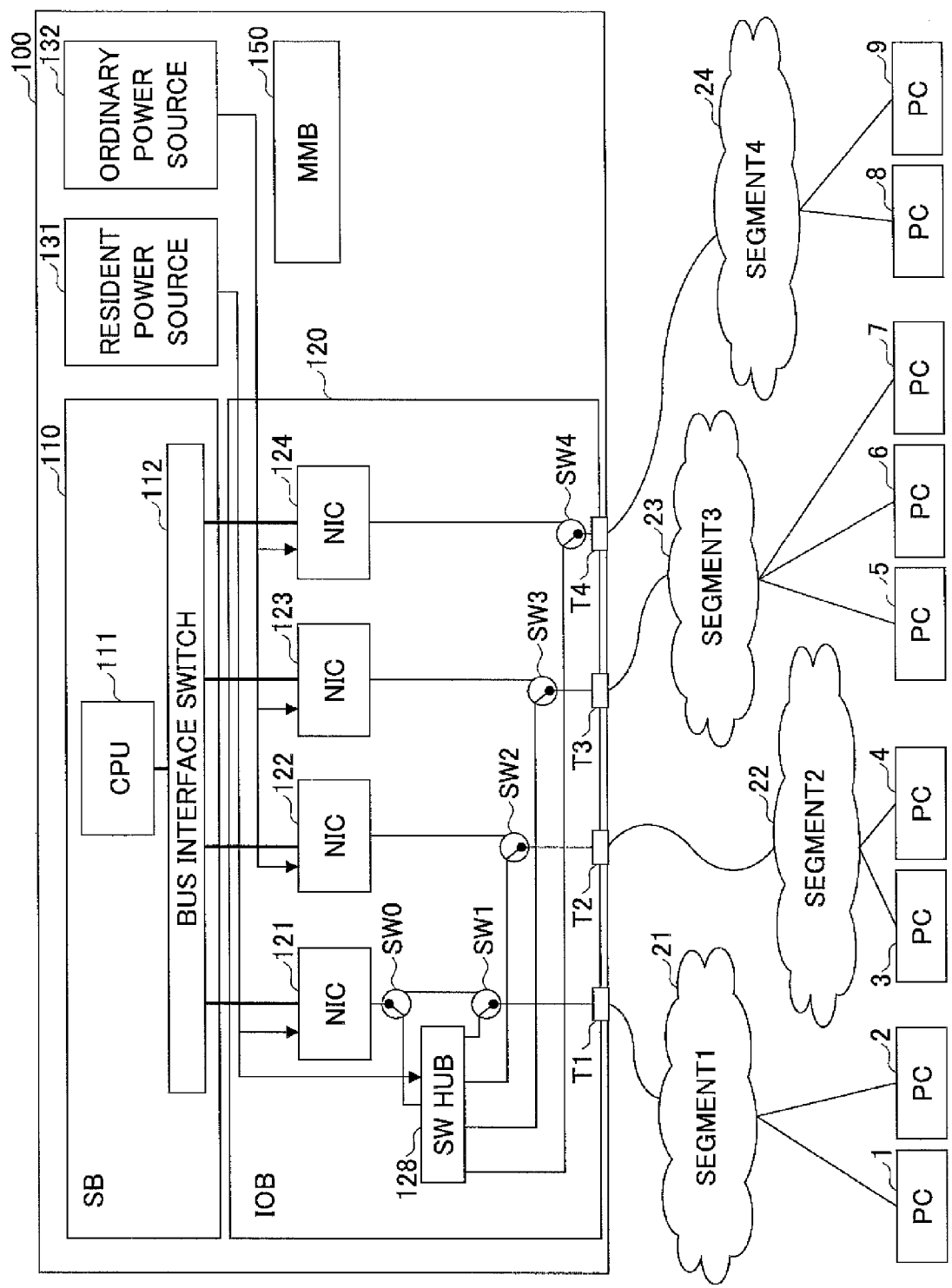
FIG. 2 is a block chart illustrating a structural example of activating PCs of a First Embodiment.

Referring to FIG. 2, the information processing apparatus 1100 illustrated in FIG. 1 has a structure substantially similar to the information processing apparatus 100 of the First Embodiment. Portions of the information processing apparatus 100 of the First Embodiment being the same as portions of the information processing apparatus 1100 illustrated in FIG. 1 are designated by the same reference symbols, and description of the same portions is omitted. Different portions are described in detail.

Referring to FIG. 2, the information processing apparatus 100 includes a system board 110 and an I/O board 120. The I/O board 120 differs from the I/O board 1120 illustrated in FIG. 1 in that the I/O board 120 includes a switching hub 128 and connection change-over switches SW0, SW1, SW2, SW3 and SW4.

The information processing apparatus 100 of the First Embodiment includes the MMB 150. The MMB 150 differs from the MMB 1150 illustrated in FIG. 1 in that the MMB 150 has functions of controlling the switching hub 128 and the connection change-over switches SW0, SW1, SW2, SW3 and SW4.

The switching hub 128 is connected to the NIC 121 via the connection change-over switch SW0. The switching hub 128 is connected to a LAN connector T1 for connecting the NIC 121 to a corresponding segment 1 21 via the connection change-over switch SW1. The switching hub 128 is connected to a LAN connector T2 for connecting the NIC 122 to a corresponding segment 2 22 via the connection change-over switch SW2. The switching hub 128 is connected to a LAN connector T3 for connecting the NIC 123 to a corresponding segment 3 23 via the connection change-over switch SW3. The switching hub 128 is connected to a LAN connector T4 for connecting the NIC 124 to a corresponding segment 4 24 via the connection change-over switch SW4.

The connection change-over switch SW0 changes connection destination of the NIC 121 between the switching hub 128 and the connection change-over switch SW1. The connection change-over switch SW1 changes the connection destination of the LAN connector T1 of the NIC 121 between the switching hub 128 and the connection change-over switch SW0. The connection change-over switch SW2 changes the connection destination of the LAN connector T2 of the NIC 122 between the switching hub 128 and the NIC 122. The connection change-over switch SW3 changes the connection destination of the LAN connector T3 of the NIC 123 between the switching hub 128 and the NIC 123. The connection change-over switch SW4 changes the connection destination of the LAN connector T4 of the NIC 124 between the switching hub 128 and the NIC 124.

The NIC 122, the NIC 123 and the NIC 124 are supplied with power from an ordinary power source 132, and the NIC 121 is supplied with power from a resident power source 131. The switching hub 128 is supplied with power from the resident power source 131.

Figure 3:
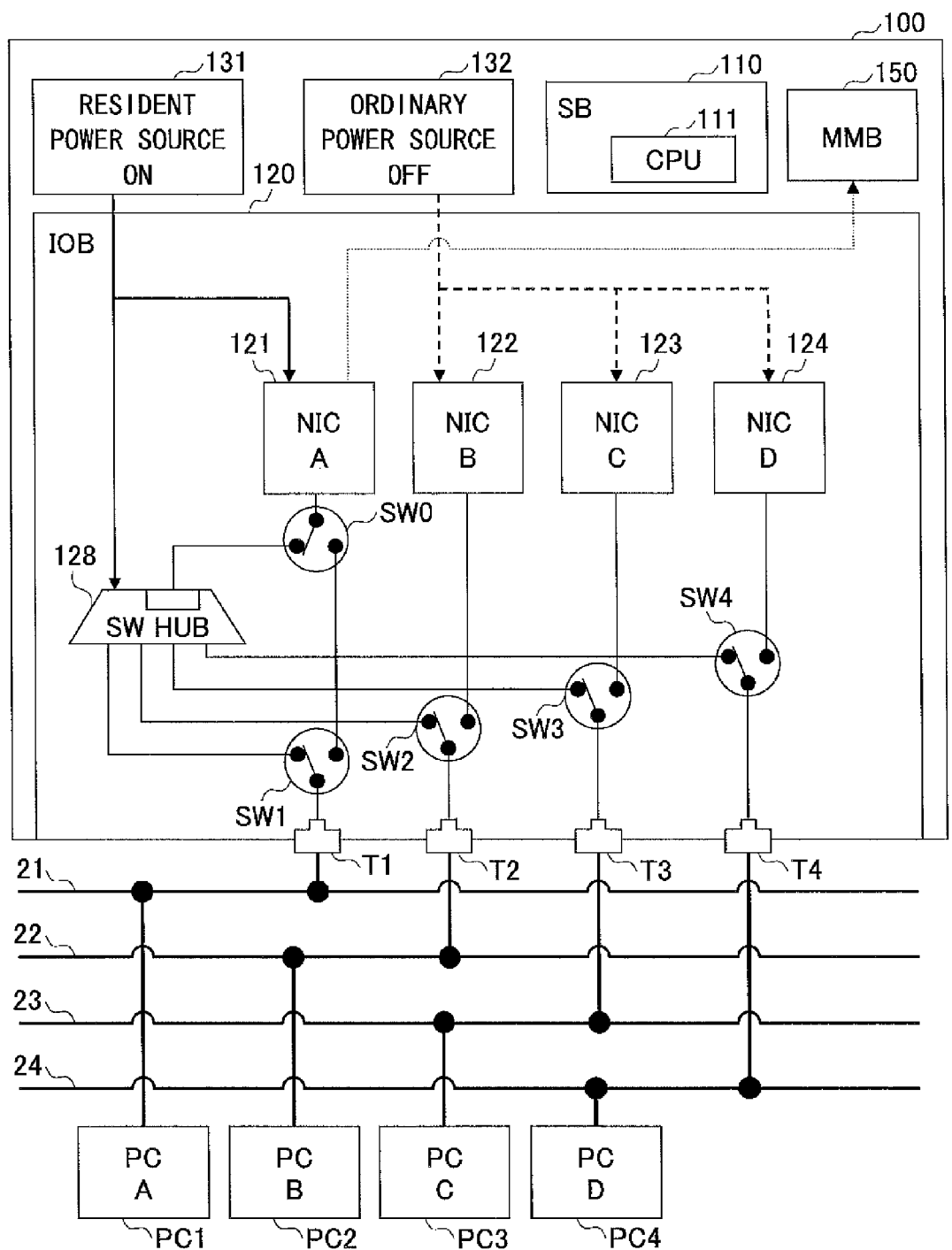
FIG. 3 is a block chart schematically illustrating operations in the First Embodiment.
Figure 4:
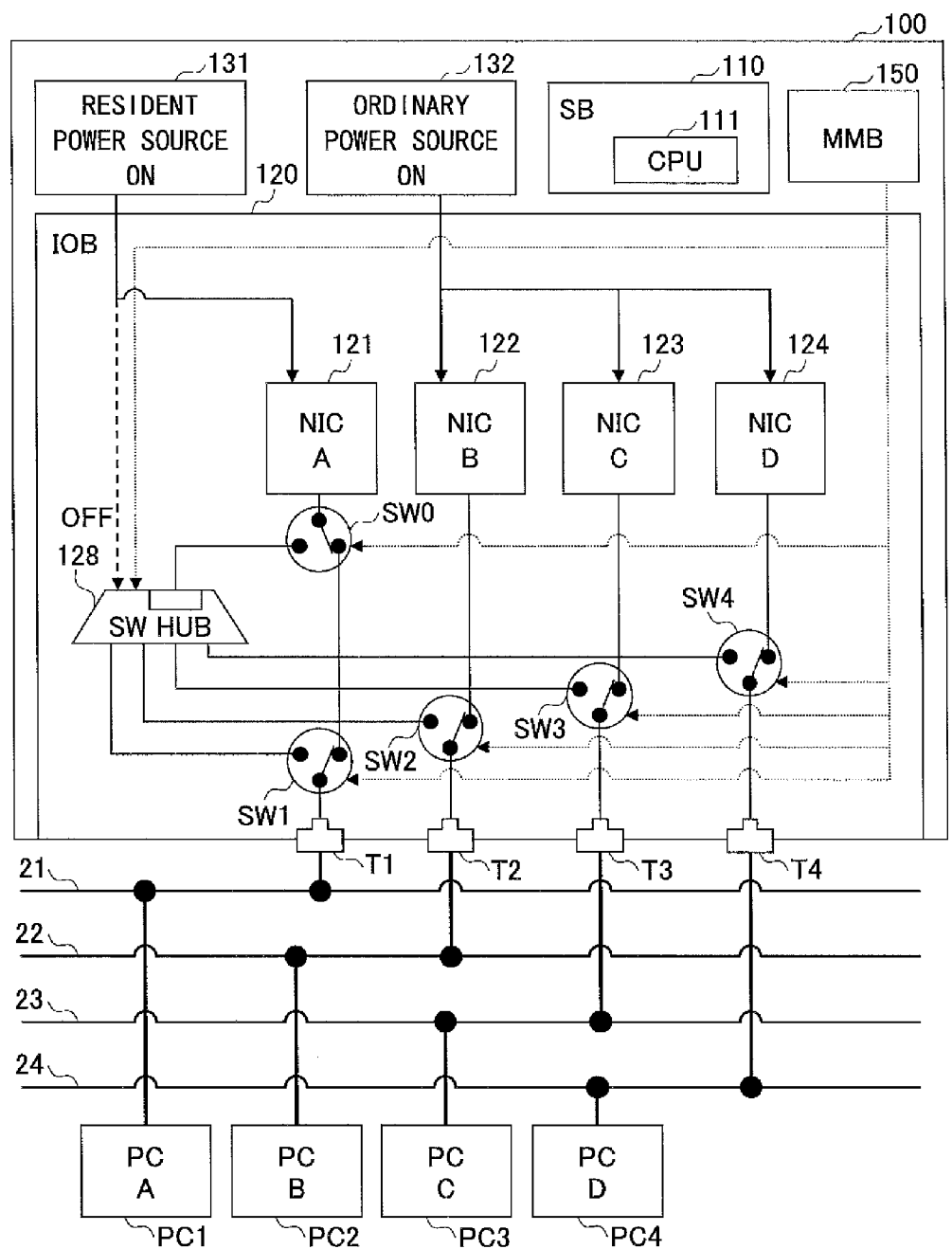
FIG. 4 is a block chart schematically illustrating operations in the First Embodiment.

Referring to FIG. 3 and FIG. 4, the operations of the information processing apparatus 100 of the First Embodiment 1 are schematically described. The structures illustrated in FIG. 3 and FIG. 4 are similar to the structure illustrated in FIG. 2. However, the segments 21 to 24 are indicated by linear lines for convenience. The linear lines 21 to 24 indicate the segment 1 21 to the segment 4 24 included in the LAN. For example, the personal computers are connected to the segments 1 21 to the segment 4 24 one by one. The number of the personal computers PC1, PC2, PC3 and PC4 respectively connected to the segments 21, 22, 23 and 24 is four.

FIG. 3 illustrates a case where the information processing apparatus 100 is in the standby state. In the standby state, the resident power source 131 supplies the power to the NIC 121 and the switching hub 128, and the ordinary power source 132 stops supplying the power. Therefore, the power is not supplied to the other NIC 122, NIC 123 and NIC 124 (the three NICs) and the NICs 122, NIC 123 and NIC 124 may not receive the packet. Here, the NIC 121 may correspond to only one network interface device, and the other NICs 122 to 124 may correspond to other network interface devices.

In the standby state, the connection change-over switch SW0 may connect the NIC 121 to the switching hub 128. The connection change-over switches SW1 to SW4 connect the LAN connectors T1 to T4 respectively to the switching hub 128.

A case where any one of the four personal computers PC1 to PC4 connected to the four segments 21 to 24 sends a magic packet in the standby state is assumed. The magic packet may be predetermined data. The magic packet reaches the information processing apparatus 100 via a segment and a LAN connector corresponding to the personal computer being the sending source of the magic packet. For convenience, the personal computer which has sent the magic packet is assumed to be the personal computer PC2. In this case, the magic packet reaches the information processing apparatus 100 via the corresponding segment 22 and the LAN connector T2. Thereafter, the magic packet reaches the switching hub 128 from the connector T2 via the connection change-over switch SW2. The switching hub 128 changes the destination of the magic packet to the NIC 121 powered by the resident power source 131. The magic packet with its destination changed is sent to the connection change-over switch SW0. The magic packet with its destination changed reaches the NIC 121 being the changed destination of the magic packet via the connection change-over switch SW0. As described, the power is supplied to the NIC 121 from the resident power source 131 even in the standby state. As a result, the NIC 121 may receive the magic packet and process the magic packet. As described, the NIC 121, NIC 122 and NIC 123 and NIC 124 have functions of the Wake-on LAN activation. Therefore, when the NIC 121 receives the magic packet, the power-on signal is sent to the MMB 150 by the Wake-on LAN activation. When the MMB 150 receives the power-on signal, the MMB 150 starts initial setup of the boards of the information processing apparatus 100 and activates the information processing apparatus 100. Referring to FIG. 4, the MMB 150 starts to supply the power to the NIC 122, the NIC 123 and the NIC 124 with the ordinary power source 132. As a result, the NIC 122, the NIC 123 and the NIC 124 other than the operating NIC 121 supplied with the power from the resident power source 131 are supplied with the power from the ordinary power source 132 to be activated.

Further, the MMB 150 controls the connection of change-over switches SW0 to SW4 (the five switches) to change over these. Said differently, the connection change-over switch SW0 connects the NIC 121 to the connection change-over switch SW1, and the connection change-over switch SW1 connects the LAN connector T1 of the NIC 121 to the connection change-over switch SW0. The connection change-over switches SW2 to SW4 connect the LAN connectors T2 to T4 to the corresponding NIC 122, NIC 123 and NIC 124.

As a result, the personal computer PC1 is connected to the NIC 121 via the segment 21, the LAN connector T1, the connection change-over switch SW1 and the connection change-over switch SW0. The personal computer PC2 is connected to the NIC 122 via the segment 22, the LAN connector T2 and the connection change-over switch SW2. The personal computer PC3 is connected to the NIC 123 via the segment 23, the LAN connector T3 and the connection change-over switch SW3. In a manner similar thereto, the personal computer PC4 is connected to the NIC 124 via the segment 24, the LAN connector T4 and the connection change-over switch SW4. As a result, the four personal computers PC1 to PC4 are connected to the CPU 111 via the corresponding NIC 121, NIC 122, NIC 123 and NIC 124 and a bus interface switch 112 of the system board 110. As a result, the four personal computers PC1 to PC4 are individually connected to the CPU 111, and may send requests for arithmetic processing to the CPU 111 and receive results of the arithmetic processing. Thus, the information processing apparatus 100 may be in the operating state.

When the information processing apparatus 100 is in the operating state, the power supply from the resident powers source 131 to the switching hub 128 is stopped. In the operating state of the information processing apparatus 100, the function of the switching hub may not exist. The function of the switching hub 128 is to send the magic packet for the NIC 121, the NIC 122, the NIC 123 and the NIC 121 and to change the destination of the magic packet for any one of the NIC 122, the NIC 122, the NIC 123 and the NIC 124 and send the magic packet to the NIC 121.

As described, when the information processing apparatus 100 is in the operating state, the power is supplied to the NIC 121, the NIC 122, the NIC 123 and the NIC 124 (the four NICs) and the power supply to the switching hub 128 is stopped. Further, in the operating state of the information processing apparatus 100, the LAN connectors T1 to T4 are connected to the corresponding NIC 121, the NIC 122, the NIC 123 and the NIC 124. Therefore, the power consumption of the information processing apparatus 100 in the operating state becomes similar to that of the information processing apparatus 1100 illustrated in FIG. 1 while the circuit connection of the power of the information processing apparatus 100 in the operating state becomes similar to that of the information processing apparatus 1100 illustrated in FIG. 1.

As described, in the information processing apparatus 100 of Embodiment 1, the power is supplied from the resident power source 131 only to the NIC 121 (the one NIC) and the power is not supplied to the other NIC 122, the NIC 122, the NIC 123 and the NIC 124 (the three NICs). Even if the magic packet is sent from any of the four personal computers PC1 to PC4 corresponding to the NIC 121 to the NIC 124, the magic packet is sent to the switching hub 128. The magic packet is sent to the switching hub 128 by the connection change-over switches SW1 to SW4. The switching hub 128 changes the destination of the magic packet to the NIC 121 operated by the resident power source 131 and sends the magic packet to the NIC 121. Therefore, the magic packet is received by the operating NIC 121, and the NIC 121 sends a power-on signal to the MMB 150. Therefore, the Wake-on LAN activation may be carried out without trouble. According to the First Embodiment, the power (hereinafter, referred to as the standby electricity) consumed by the information processing apparatus in the standby state may be effectively reduced, and the Wake-on LAN activation may be carried out without any trouble.

Figure 5:
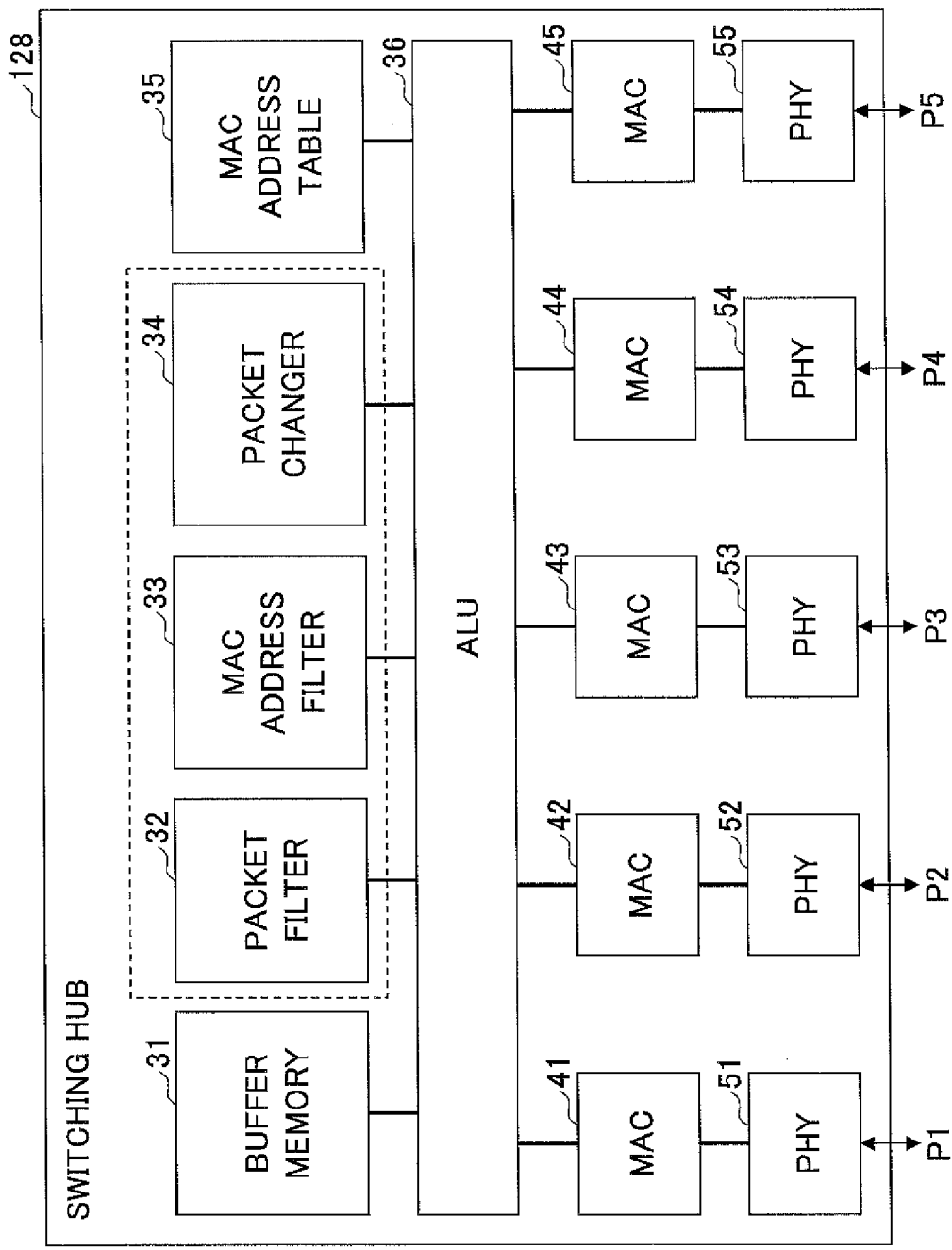
FIG. 5 is a block chart illustrating an internal structural example of a switching hub illustrated in FIG. 2.

FIG. 5 is a block chart illustrating an internal structure of the switching hub 128. The switching hub 128 includes five ports P1 to P5. The ports P1 to P5 (the five ports) are respectively connected to the connection change-over switches SW0, SW1, SW2, SW3 and SW4 (the five connection change-over switches). The switching hub 128 includes physical layer processing parts 51 to 55 and media access control parts 41 to 45. The switching hub 128 further includes an Arithmetic and Logic Unit (ALU) 36 to which the media access control parts 41 to 45 are connected. The switching hub 128 includes a buffer memory 31, a packet filter 32, a Media Access Control (MAC) address filter 33, a packet changer 34 and the MAC address table 35.

In the switching hub 128, the physical layer processing parts 51 to 55 carry out processes in the physical layer and the media access control parts 1 to 45 carry out media access controlling processes. Various arithmetic processing are provided to the sent and received packets by the ALU 36. The buffer memory appropriately buffers data. The packet filter 32 determines whether the received packet is the magic packet. The MAC address filter 33 determines whether the MAC address stored in the received packets is the address of any one of the NIC 121, the NIC 122, the NIC 123 and the NIC 124 included in the information processing apparatus 100.

The packet changer 34 changes the MAC address stored in the magic packet. Said differently, if the received magic packet is any one of the MAC addresses of the NIC 122, the NIC 123 and the NIC 124, the packet changer 34 changes the received MAC address in the standby state to the MAC address of the operating NIC 121. Among the NIC 121 to the NIC 124, the NIC 122 to the NIC 124 are assumed to be the NICs which are not operated by the resident power source 131 in the standby state.

Figure 6:
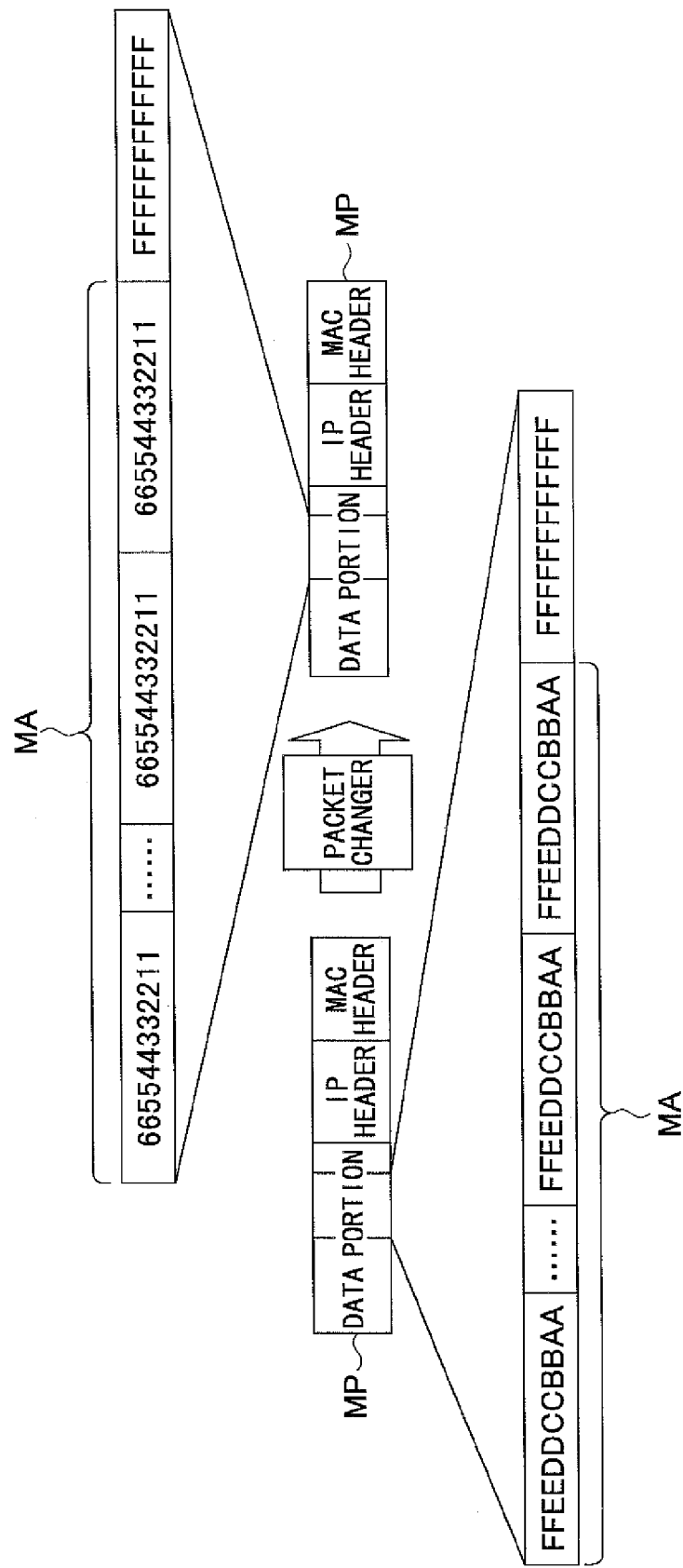
FIG. 6 illustrates a function of a packet changer illustrated in FIG. 5.

FIG. 6 illustrates a function of changing the MAC address of the magic packet carried out by the packet changer 34 of the switching hub 128. Referring to FIG. 6, the data portion of the magic packet MP on the left side stores a predetermined address of "FFFFFFFFFFFF" and subsequently sixteen MAC addresses of "FFEEDDCCBBAA" (from the left to the right).

As an example, in the data portion, the predetermined address and subsequently the packet storing sixteen MAC addresses are identified as the magic packet. For convenience, the MAC address of "FFEEDDCCBBAA" is the MAC address of the NIC 122, which is one of the NIC 122, the NIC 123 and the NIC 124 other than the operating NCI 121 in the standby state.

In this case, the packet changer 34 changes the MAC address. In the magic packet MP illustrated on the right side of FIG. 6, the MAC address is converted. In the magic packet on the right side of FIG. 6, the predetermined address "FFFFFFFFFFFF" and subsequently the sixteen MAC addresses "665544332211" are stored in the magic packet. The MAC address "665544332211" is that of the NIC 121 in the standby state.

As described, if any one of the MAC addresses of the NIC 122, the NIC 123 and the NIC 124, other than that of the operating NIC 121 in the standby state, is stored in the data portion of the received packet, the packet changer 24 changes the MAC address. The MAC address is converted to the MAC address of the operating NIC 121 in the standby state. Said differently, when the destination of the received packet is any one of the three NICs, i.e., the NIC 122, the NIC 123 and the NIC 124 other than the operating NIC 121 in the standby state, the packet changer 24 changes the destination to the operating NIC 121 in the standby state.

The MAC address table 35 illustrated in FIG. 5 previously stores the MAC addresses of the four NICs, i.e., the NIC 121, the NIC 122, the NIC 123 and the NIC 124, included in the information processing apparatus 100. The MAC address filter 33 refers to the MAC address table 35 and determines the NIC for which the received packet is bound among the four NICs, i.e., the NIC 121, the NIC 122, the NIC 123 and the NIC 124.

Figure 7:
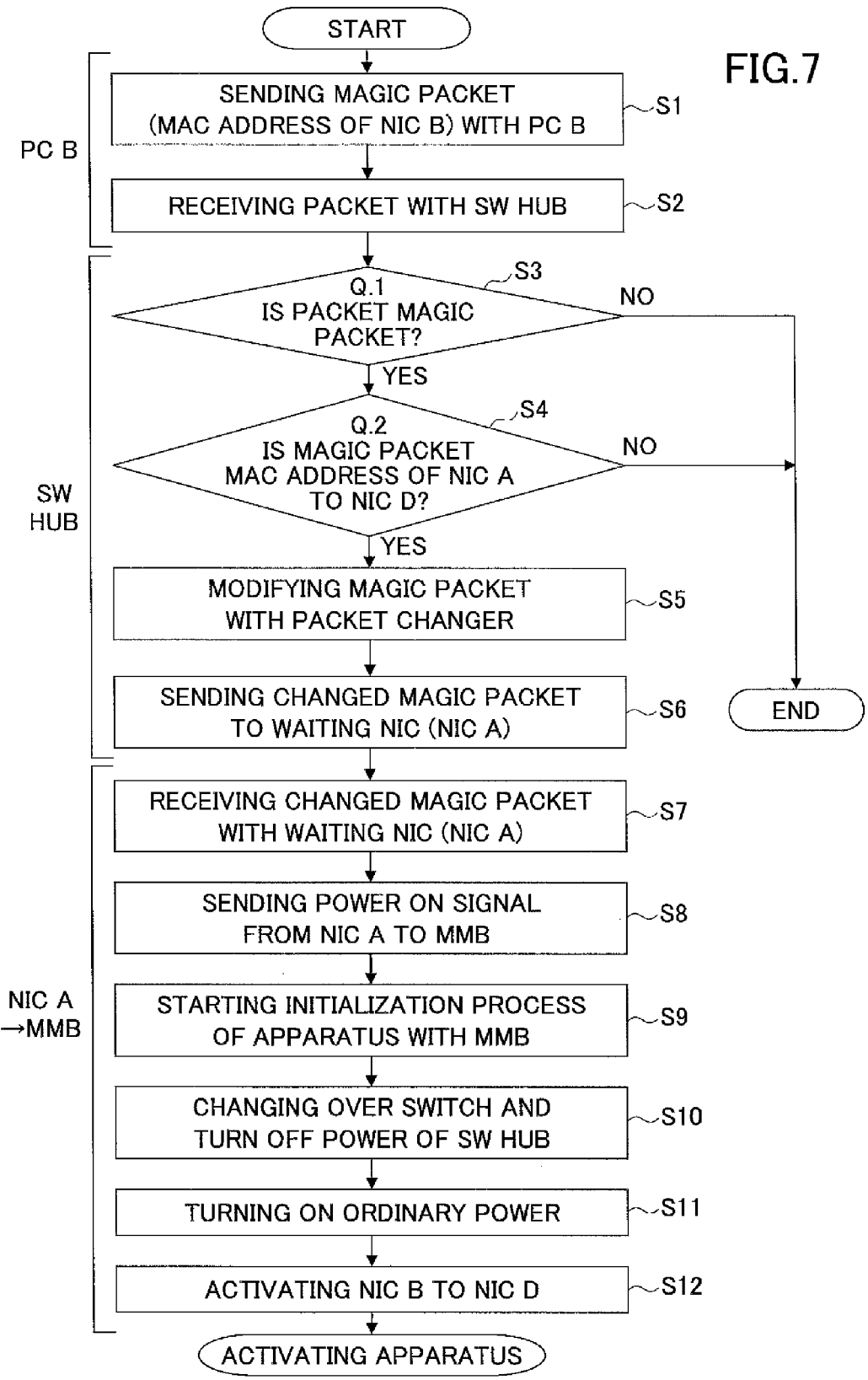
FIG. 7 is a flowchart illustrating an exemplary operation of the First Embodiment.
Figure 8:
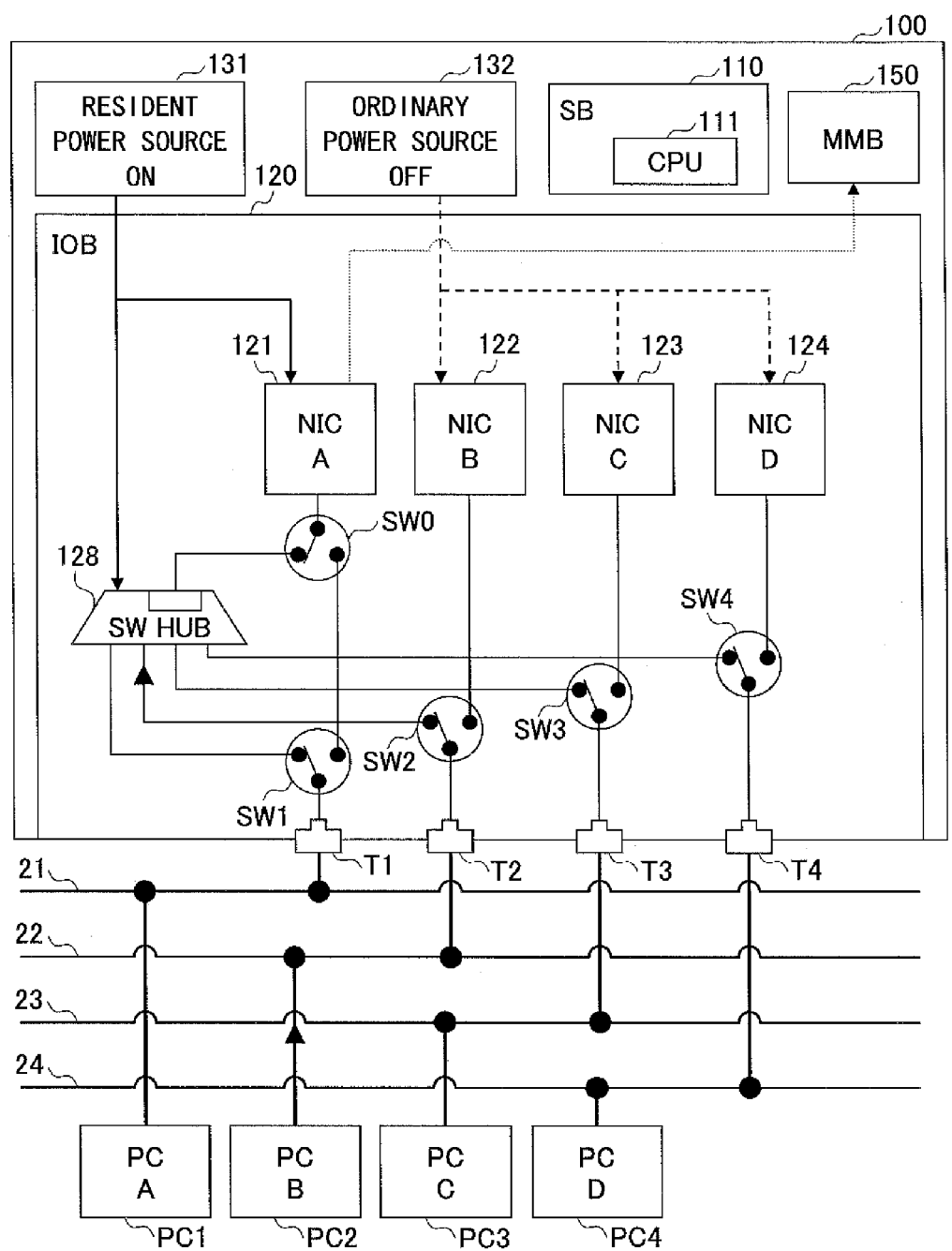
FIG. 8 is a block chart 1 for illustrating a flowchart illustrated in FIG. 7.
Figure 9:
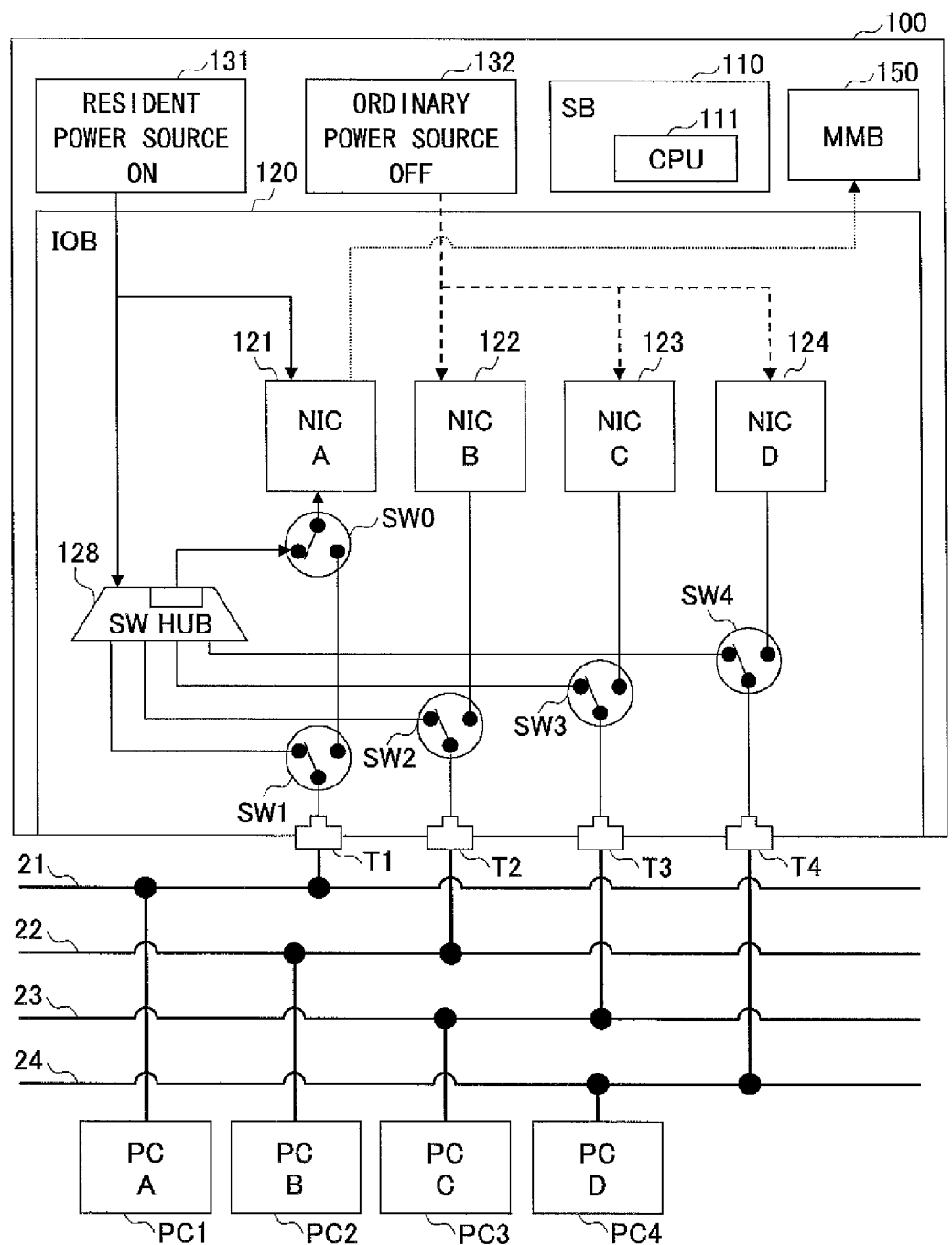
FIG. 9 is a block chart 2 for illustrating the flowchart illustrated in FIG. 7.

Referring to FIG. 7 to FIG. 12, an example of a flow of the Wake-on LAN activation of the information processing apparatus 100 of the First Embodiment after the personal computer PC2 sends the magic packet is described. The information processing apparatus 100 is in the standby state. In the information processing apparatus under the standby state, the resident power source 131 supplies power from the resident power source 131 to the NCI 121 and the switching hub 128. The five connection change-over switches SW0 to SW4 are connected as follows. Referring to FIG. 8, the connection change-over switch SW0 may connect the NIC 121 to the switching hub 128. The connection change-over switch SW1 connects the LAN connector T1 to the switching hub 128. The connection change-over switch SW2 connects the LAN connector T2 for the NIC B 122 to the switching hub 128, and the connection change-over switch SW3 connects the LAN connector T3 for the NIC B 123 to the switching hub 128. In a similar manner thereto, the connection change-over switch SW4 connects the LAN connector T4 for the NIC 214 to the switching hub 128.

Under the above state, it is assumed that the personal computer PC2 sends the magic packet to the NIC 122 of the information processing apparatus 100 in step S1 of FIG. 7. In this case, in step S2, the switching hub 128 receives the magic packet via the connection change-over switch SW2 as illustrated in FIG. 8.

The switching hub 128 determines whether the received packet is the magic packet in step S3. More specifically, it is determined whether a data portion of the packet received by the packet filter 32 contains "FFFFFFFFFFFF+(MAC address×16)". When the "FFFFFFFFFFFF+(MAC address× 16)" is contained in the data portion of the received packet in YES of step S3, the received packet is the magic packet. Therefore, the process moves to step S4. When the "FFFFFFFFFFFF+(MAC address×16)" is not contained in the data portion of the received packet in NO of step S3, the received packet is not the magic packet. Therefore, the process ends.

In step S4, the switching hub 128 determines the destination of the received packet among the four NICs, i.e., the NIC 121, the NIC 122, the NIC 123 and the NIC 124 included in the information processing apparatus 100. More specifically, the MAC address filter 33 determines the MAC address contained in the data portion of the packet is the MAC address previously registered in the MAC address table 35. As the result of the determination, if the MAC address contained in the data portion is the MAC address previously registered in the MAC address table 35 in YES of step S4, the process moves to step S5. As the result of the determination, if the MAC address contained in the data portion is not the MAC address previously registered in the MAC address table 35 in NO of step S4, the process ends. This is because the packet is not a packet directed to any of the NIC 121, the NIC 122, the NIC 123 and the NIC 124 inside the information processing apparatus 100.

In step S5, if the destination of the received packet is not the operating NIC 121 in the standby state, the packet changer 34 of the switching hub 128 converts the destination. In this case, the packet changer 34 converts the destination of the received packet to the operating NIC 121 in the standby state. Meanwhile, if the destination of the received packet is the operating NIC 121 in the standby state, the packet changer 34 of the switching hub 128 does not convert the destination. In this case, the destination of the received packet is maintained.

The NIC 122 being the original destination of the packet is not supplied with the power and stopped since the information processing apparatus 100 is in the standby state. Therefore, the NIC 122 may not receive the packet nor process the packet. The magic packet whose destination is converted to the NIC 121 by the packet changer 34 is hereinafter referred to as "a changed magic packet". For convenience, the magic packet whose destination is the operating NIC 121 in the standby state and maintained may also be referred to as "the changed magic packet".

Figure 10:
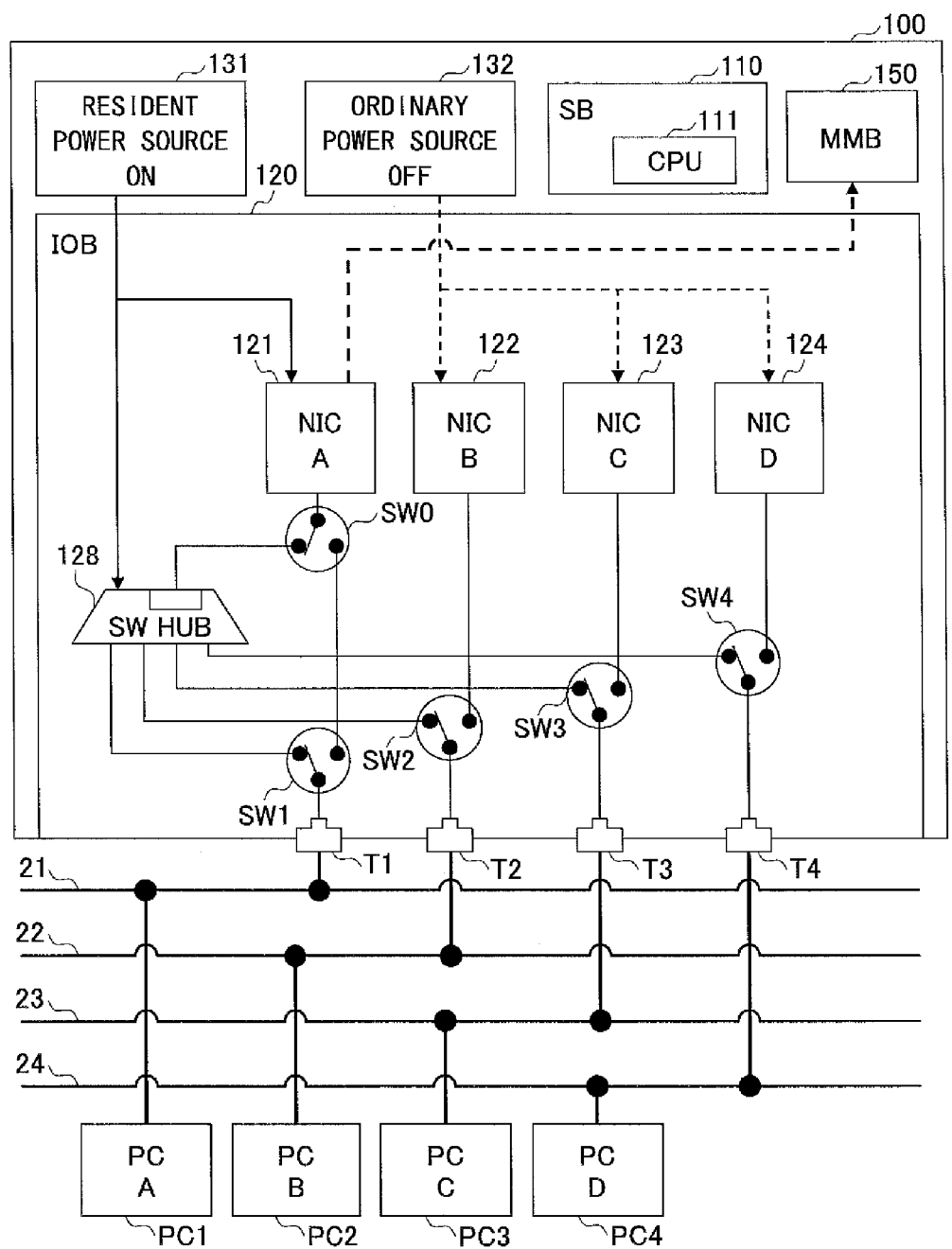
FIG. 10 is a block chart 3 for illustrating the flowchart illustrated in FIG. 7.

The switching hub 128 sends the changed magic packet to the NIC 121. As in step S7 of FIG. 7 and in FIG. 9, the NIC 121 receives the changed magic packet via the connection change-over switch SW0. Next, in step S8, the NIC 121 sends the power-on signal to the MMB 150 as illustrated in FIG. 10 by the function of the Wake-on LAN activation.

Figure 11:
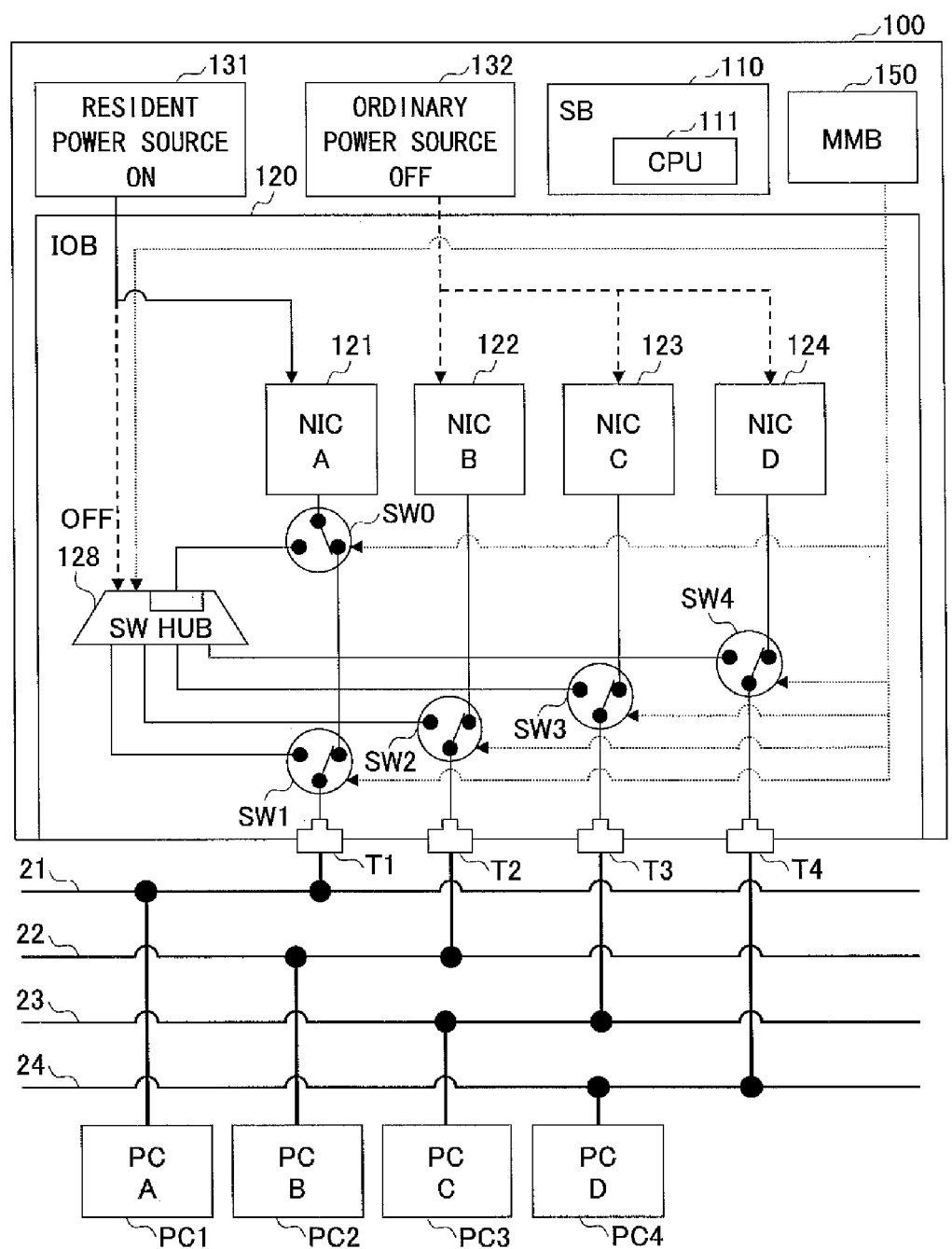
FIG. 11 is a block chart 4 for illustrating the flowchart illustrated in FIG. 7.

When the MMB 150 receives the power-on signal, the MMB 150 starts initial setup of various boards of the information processing apparatus 100 and activates the information processing apparatus 100 in step S9. While the MMB 150 activates the information processing apparatus 100, the MMB 150 stops supplying the power from the resident power source 131 to the switching hub 128 as illustrated in FIG. 11. On the other hand, the power is supplied to the NIC 121 from the resident power source 131. Further, the MMB 150 controls the connection change-over switches SW0 to SW4 (the five switches) to change over these.

Said differently, the connection change-over switch SW0 connects the NIC A 121 to the connection change-over switch SW1, and the connection change-over switch SW1 connects the LAN connector T1 of the NIC A 121 to the connection change-over switch SW0. The connection change-over switch SW2 connects the LAN connector T2 for the NIC B 122 to the NIC B 122, and the connection change-over switch SW3 connects the LAN connector T3 for the NIC C 123 to the NIC C 123. In a similar manner thereto, the connection change-over switch SW4 connects the LAN connector T4 for the NIC D 124 to the NIC D 124.

Figure 12:
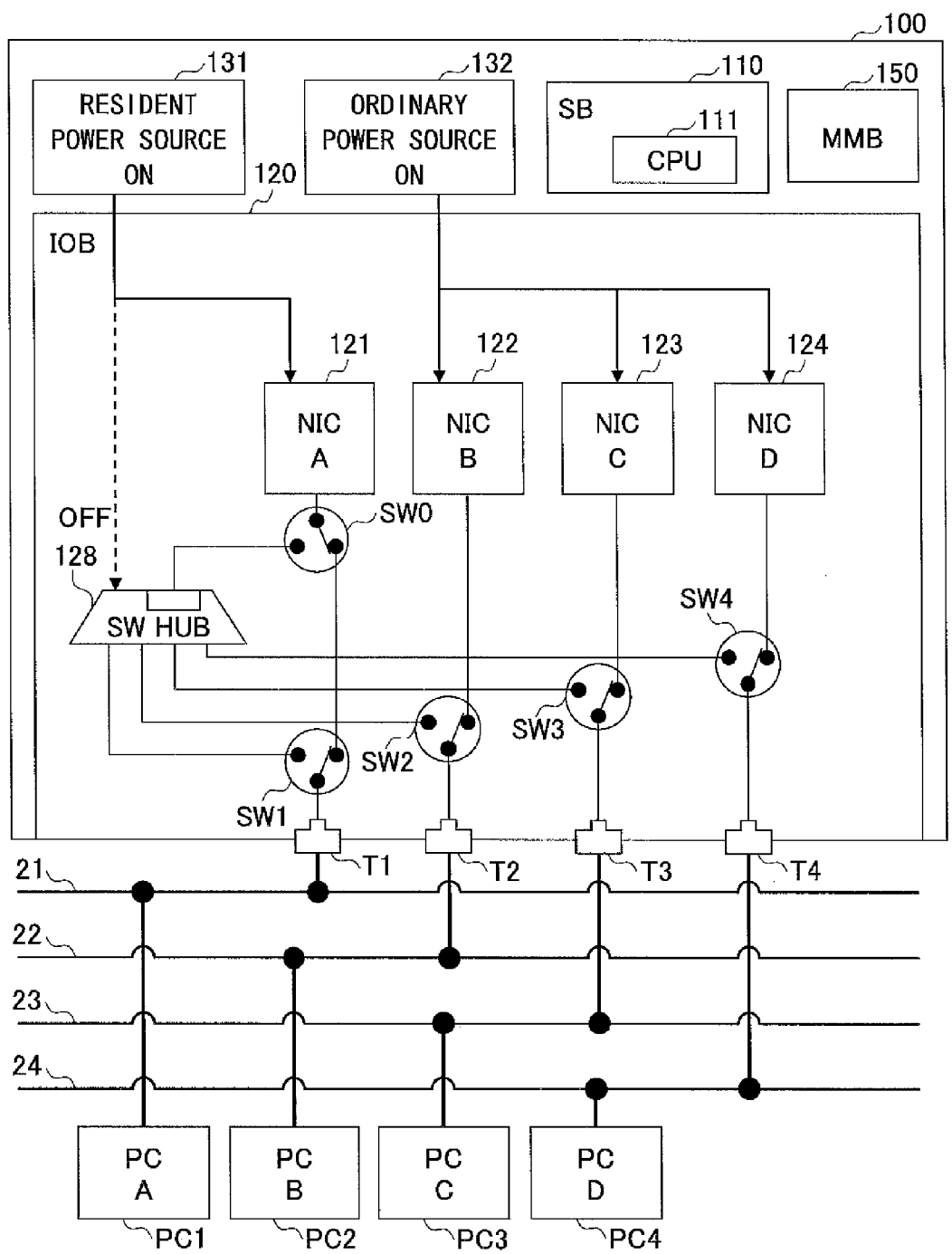
FIG. 12 is a block chart 5 for illustrating the flowchart illustrated in FIG. 7.

Next, the MMB 150 starts to supply the power to the NIC 122 to the NIC 124 with the ordinary power source 132 as illustrated in FIG. 12. As described, the information processing apparatus 100 becomes in the operating state and the information processing apparatus is ready for the activation.

With the First Embodiment, the information processing apparatus 100 includes the four NICs, i.e. the NIC 121, the NIC 122, the NIC 123 and the NIC 124. However, the First Embodiment is not limited thereto and NICs as few as three or less and as many as five or more may be provided.

Figure 13:
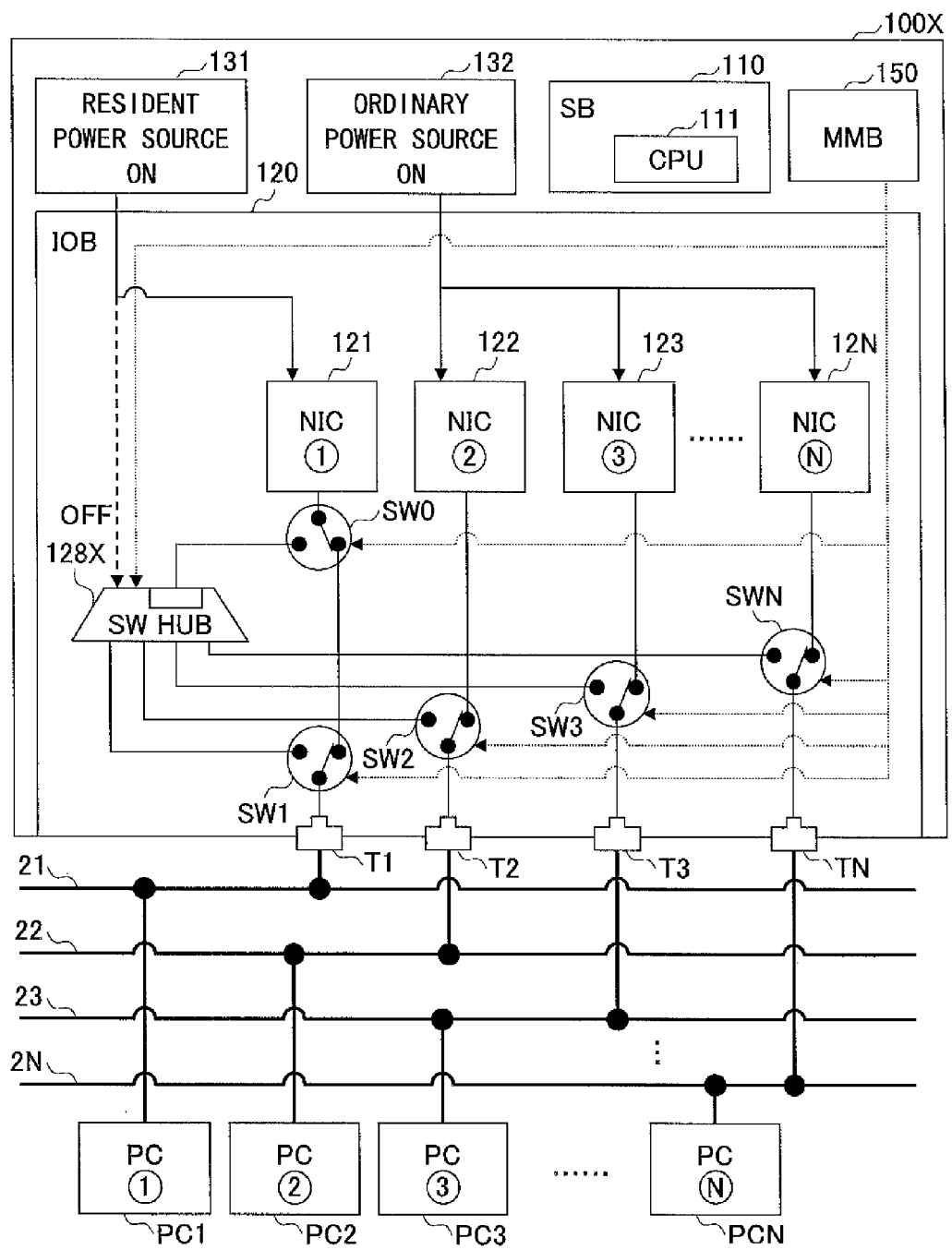
FIG. 13 is a block chart illustrating a structural example of activating PCs of a Second Embodiment.

FIG. 13 is a block chart of an information processing apparatus 100X of a Second Embodiment.

The information processing apparatus 100X of the Second Embodiment differs from the information processing apparatus 100 of the First Embodiment at a point that the number of the NICs is N and the NIC 121, the NIC 122, . . . and the NIC 12N are provided. The N may be an integer of two or more. As a result, the number of the corresponding LAN connectors is N. The corresponding LAN connectors may be referred to as T1, T2, . . . , TN. The number of the connection change over switches is N. The connection change over switches may be referred to as SW1, SW2, . . . SWN. The number of the segments connected to the outside is N corresponding to the number of the NICs. The segments 21, 22, . . . , 2N are connected to the NICs. The segments as many as N are connected to the personal computers PC1, PC2, . . . , PCN. The number of the personal computers connectable to the segments is not limited to one. As illustrated in FIG. 2, plural personal computers may be connected to each of the segments.

The operation of the information processing apparatus 100X of the Second Embodiment is similar to the operation of the information processing apparatus 100 of the First Embodiment, and the already described explanations are omitted. In the case of the First Embodiment, the three NICs, i.e., the NIC 122, the NIC 123 and the NIC 124, are provided in addition to the NIC 121. In the case of the Second Embodiment, the NICs as many as (N−1), i.e., the NIC 122 to the NIC 12N, are provided in addition to the NIC 121. The NIC 121 is operated in a similar manner to the NIC 121 of the First Embodiment. The connection change-over switch SW0 is operated in a similar manner to the connection change-over switch of the First Embodiment. The connection change-over switches as many as N, i.e., the connection change-over switches SW1 to SWN, function in a similar manner to the four connection change-over switches, i.e., the connection change-over switches SW1 to SW4, of the First Embodiment.

In the information processing apparatus 100X in the standby state of the Second Embodiment, the NIC 121 and the switching hubs 128X are operated by being supplied with the power. The NICs as many as (N−1), i.e., the NIC 122 to the NIC 12N, are not supplied with the power and are not operated.

The switching hub 128X of the Second Embodiment differs from the switching hub 128 of the First Embodiment and is connected to the connection change-over switches SW1 to SWN as many as N in addition to the connection change-over switch SW0. The switching hub 128X of the Second Embodiment receive a magic packet which is sent from any one of the personal computers PC1 to PCN as many as N via the corresponding connection change-over switches SW1 to SWN as many as N. In a similar manner to steps S3 and S4 of the First Embodiment illustrated in FIG. 7, it is confirmed that the received packet is the magic packet and which is the destination of the received packet among the NICs as many as N, i.e., the NIC 122 to the NIC 12N. After the confirmation, the switching hub 128X sends the magic packet in a similar manner to the First Embodiment to the operating NIC 121 powered by the resident power source 131. The NIC 121 sends a power-on signal the MMB 150 with the function of the Wake-on LAN activation. When the MMB 150 receives the power-on signal, the MMB 150 starts initial setup of various boards of the information processing apparatus 100 and activates the information processing apparatus 100 in a similar manner to the First Embodiment.

Further, the MMB 150 controls the connection change-over switches SW0, SW1, SW2, . . . , SWN as many as (N+1) to change over these, in a similar manner to the First Embodiment. Said differently, the MMB 150 changes a connection of the connection change-over switch SW0 from the switching hub 128X to the connection change-over switch SW1. Said differently, the MMB 150 changes a connection of the connection change-over switch SW0 from the switching hub 128X to the connection change-over switch SW1. In a similar manner thereto, the connection change-over switch SW2 is changed over from the switching hub 128X to the NIC 122. In a similar manner thereto, the connections of the connection change-over switches SW2 to SWN are changed over from the switching hub 128X to the respective NIC 122 to NIC 12N. As a result, the segment 21 is connected to the NIC 121 via the connection change-over switch SW1 and the connection change-over switch SW0. The segments 22 to 2N as many as (N-1) are connected to the NIC 122 to the NIC 12N as many as (N-1) via the connection change-over switches SW2 to SWN as many as (N-1).

Figure 14:
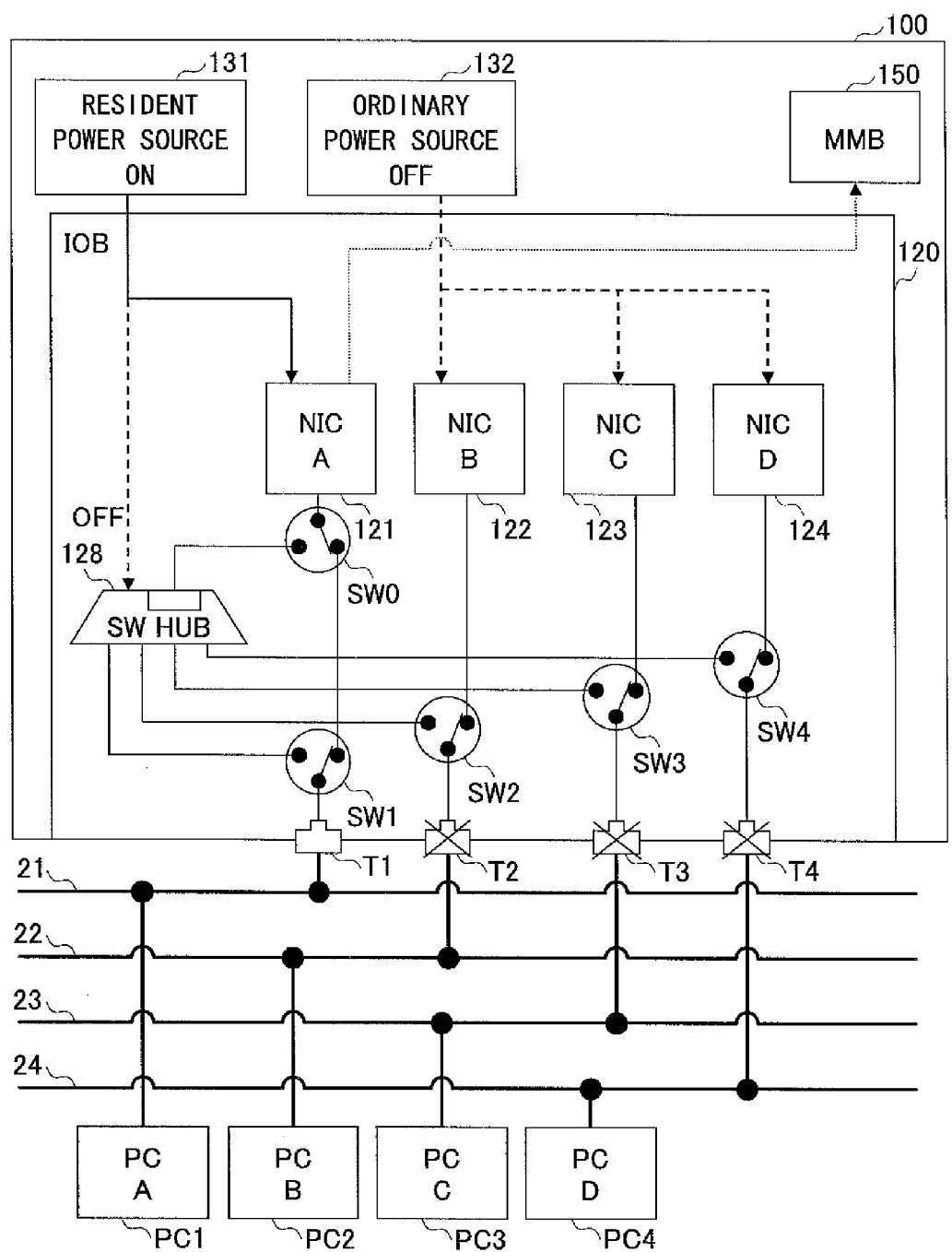
FIG. 14 is a block chart illustrating another example of the First Embodiment.

FIG. 14 is a block chart illustrating another example of the First Embodiment. The structure illustrated in FIG. 14 is similar to the structure of the First Embodiment illustrated in FIG. 2, FIG. 3 and FIG. 4. However, the method of activating the information processing apparatus 100 differs from those illustrated in FIG. 3 to FIG. 12. In the example illustrated in FIG. 14, the LAN connector for activating the information processing apparatus 100 with the Wake-on LAN is limited to the LAN connector T1. Referring to FIG. 14, the personal computer activating the information processing apparatus with the Wake-on LAN is previously determined as the personal computer PC1 connected to the LAN connector T1, for example.

In the information processing apparatus 100 under the standby state of the example illustrated in FIG. 14, the NIC 121 is operated by being supplied with the power with the resident power source 131 and the remaining three NICs, i.e., the NIC 122, the NIC 123 and the NIC 124, are not operated without the power supply. These operations are similar to the above described method illustrated in FIG. 3 to FIG. 12. In the example of the method illustrated in FIG. 14, the power is not supplied to the switching hub 128 in the standby state. This is different from the above method illustrated in FIG. 3 to FIG. 14. In the example illustrated in FIG. 14, the connections of the connection change-over switches in the standby state are similar to the connections of the connection change-over switches in the operating state. Referring to FIG. 14, the connection change-over switch SW0 connects the NIC 121 to the connection change-over switch SW1. The connection change-over switch SW1 connects the LAN connector T1 to the connection change-over switch SW0. The connection change-over switches SW2 to SW4 connect the LAN connectors T2 to T4 to the corresponding three LAN connectors, i.e., the NIC 122, the NIC 123 and the to the NIC 124.

In the example illustrated in FIG. 14, the connections of the connection change-over switches in the standby state are similar to the connections of the connection change-over switches in the operating state. However, by limiting the LAN connector causing the information processing apparatus 100 to activate with the Wake-on LAN to the LAN connector T1, the Wake-on LAN activation may be carried out without trouble. Said differently, in the example illustrated in FIG. 14, the LAN connector for activating the information processing apparatus 100 with the Wake-on LAN is limited to the LAN connector T1. Therefore, the magic packet arrives at the LAN connector T1. As a result, even if the information processing apparatus 100 is in the standby state, the magic packet reaches the operating NIC 121 powered by the resident power source 131. Therefore, the power-on signal is sent to the MMB 150 from the NIC 121 in a similar manner to the above method illustrated in FIG. 3 to FIG. 12 to thereby carry out the Wake-on LAN activation without trouble. According to the example illustrated in FIG. 14, the power is not supplied from the resident power source 131 to the switching hub 128 in the standby state. Therefore, in comparison with the case illustrated in FIG. 3 to FIG. 12, the standby electricity may further be reduced.

Figure 15:
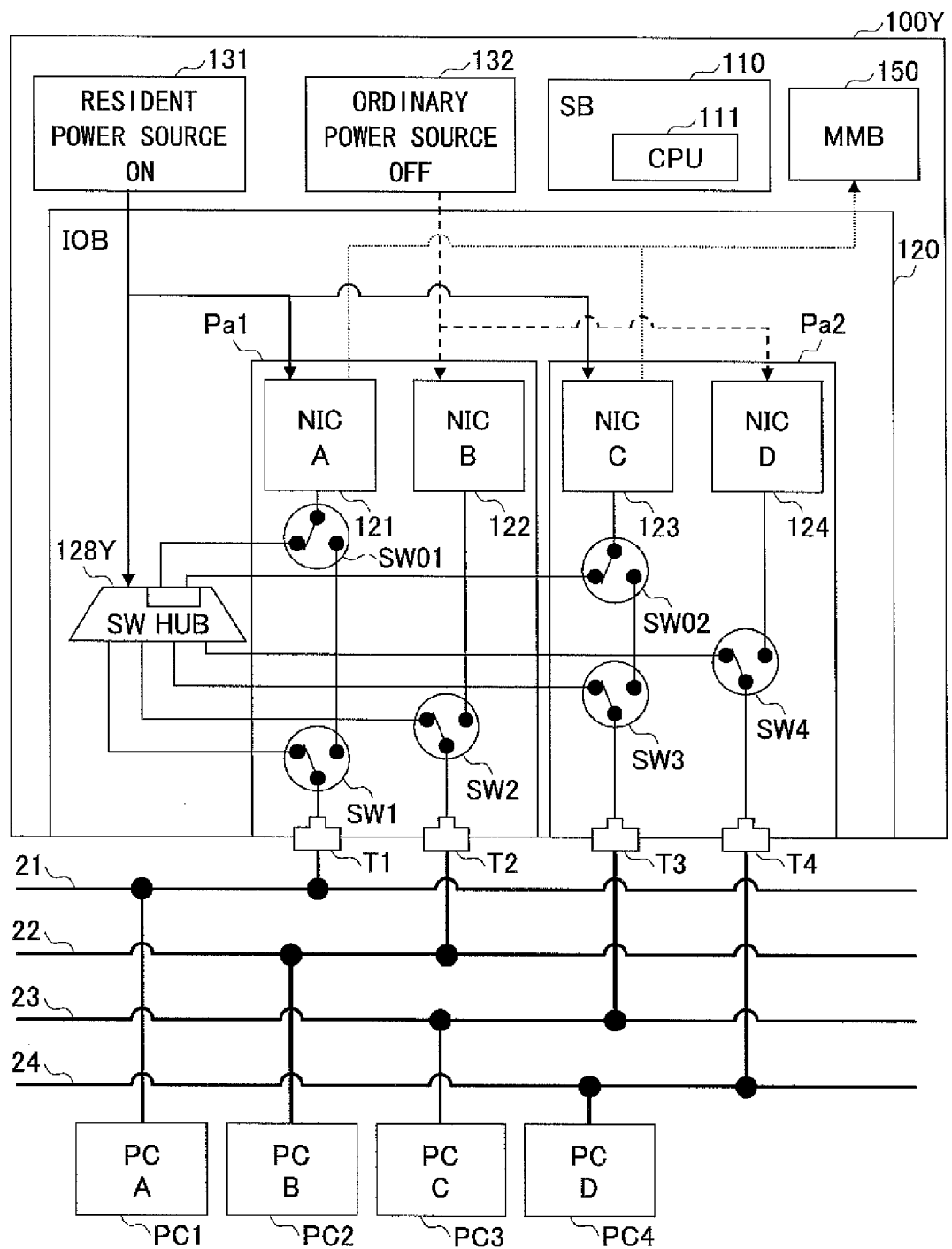
FIG. 15 is a block chart illustrating a structural example of activating PCs of a Third Embodiment.

FIG. 15 is a block chart of an information processing apparatus 100Y of a Third Embodiment.

In the information processing apparatus 100Y of a Third Embodiment, the four NICs, i.e., the NIC 121, the NIC 122, the NIC 123 and the NIC 124, are divided by partitioned part Pa1 and Pa2 to form two pairs of NICs in comparison with the information processing apparatus 100 of the First Embodiment. Constituent elements of the Third Embodiment similar to those of the First Embodiment are added with the same reference symbols, already described explanations are appropriately omitted, and different points are specifically described.

With the Third Embodiment, the two NICs, i.e., the NIC 121 and the NIC 122, are included in the partitioned part Pa1, the other two NICs, i.e., the NIC 123 and the NIC 124, are included in the partitioned part Pa2. In the case of Embodiment 1, the magic packet is sent to the operating NIC 121 powered by the resident power source 131 if the magic packet is sent to any one of the four NICs, i.e., the NIC 121, the NIC 122, the NIC 123 and the NIC 124. This operation is carried out by the connection change-over switches SW0 to SW4 and the switching hub 128. On the other hand, with the Third Embodiment, the NIC powered by the resident power source 131 is allocated for each of the partitioned part. Referring to FIG. 15, the NIC 121 of the two NICs, i.e., the NIC 121 and the NIC 122 included in the partitioned part Pa1 is operated even if the NIC 121 is in the standby state. The other NIC 122 in the standby state is not operated without being supplied with the power. In a similar manner thereto, the NIC 123 of the two NICs, i.e., the NIC 123 and the NIC 124 included in the partitioned part Pa2 is operated even if the NIC 123 is in the standby state. The other NIC 124 in the standby state is not operated without being supplied with the power.

With the Third Embodiment, connection change-over switches SW01 and SW02 are respectively provided for the NIC 121 in the partitioned part Pa1 and the NIC 123 in the partitioned part Pa2 which are operated by the resident power source. As a result, with the Third Embodiment, six connection change-over switches, i.e., the connection change-over switches SW01, SW1 and SW2 (for the partitioned part Pa1)

and the connection change-over switches SW02, SW3 and SW4 (for the partitioned part Pa2) are provided as illustrated in FIG. 15.

In the partitioned part Pa1, the connection change-over switch SW01 connects the NIC 121 to the switching hub 128Y under the standby state. The connection change-over switches SW1 and SW2 connect the corresponding LAN connectors T1 and T2 to the switching hub 128Y. After activating the Wake-on LAN for the partitioned part Pa1, the MMB 150 carries out the following operation upon receipt of a power-on signal from the NIC 121. Said differently, the connection change-over switch SW01 connects the NIC 121 to the connection change-over switch SW1. The connection change-over switch SW1 connects the LAN connector T1 to the connection change-over switch SW01. Further, the connection change-over switch SW2 connects the corresponding LAN connector T2 to the corresponding NIC 122. As a result, the personal computer PC1 connected to the segment 21 corresponding to the NIC 121 in the partitioned part Pa1 is connected to the NIC 121 via the connection change-over switches SW1 and SW01. Meanwhile, the personal computer PC2 connected to the segment 22 corresponding to the NIC 122 in the partitioned part Pa1 is connected to the NIC 122 via the connection change-over switch SW2.

In the partitioned part Pa2, the connection change-over switch SW02 connects the NIC 123 to the switching hub 128Y under the standby state. The connection change-over switches SW3 and SW4 connect the corresponding LAN connectors T3 and T4 to the switching hub 128Y. After activating the Wake-on LAN for the partitioned part Pa2, the MMB 150 carries out the following operation upon receipt of a power-on signal from the NIC 123. Said differently, the connection change-over switch SW02 connects the NIC 123 to the connection change-over switch SW3. The connection change-over switch SW3 connects the LAN connector T3 to the connection change-over switch SW02. Further, the connection change-over switch SW4 connects the corresponding LAN connector T4 to the corresponding NIC 124. As a result, the personal computer PC3 connected to the segment 23 corresponding to the NIC 123 in the partitioned part Pa2 is connected to the NIC 123 via the connection change-over switches SW3 and SW02. Meanwhile, the personal computer PC4 connected to the segment 24 corresponding to the NIC 124 in the partitioned part Pa2 is connected to the NIC 124 via the connection change-over switch SW4.

With the Third Embodiment, an operation of sending the magic packet to any one of the two NICs, i.e., the NIC 121 and the NIC 122, included in the partitioned part Pa1 in the standby state is described. In this case, the magic packet is sent to the switching hub 128Y by the two connection change-over switches SW1 and SW2. The switching hub 128Y determines in a similar manner to steps S3 and S4 illustrated in FIG. 7. The packet received as a result of the determination is a magic packet and the destination of the received packet is one of the two NICs, i.e., the NIC 121 and the NIC 122, so that the switching hub 128Y sends the magic packet to the operating NIC 121 in the partitioned part Pa1. At this time, if the destination of the magic packet is the NIC 121, the switching hub 128Y maintains the destination without changing it. If the destination of the magic packet is the NIC 122, the switching hub 128Y changes the destination to the NIC 121. As a result, the NIC 121 receives the magic packet in a similar manner to the First Embodiment, and sends a power-on signal to the MMB 150 with the function of the Wake-on LAN activation.

When the MMB 150 receives the power-on signal, the MMB 150 starts initial setup of various boards of the information processing apparatus 100Y and activates the information processing apparatus 100Y in a similar manner to the First Embodiment. Then, the MMB 150 changes over the connections of the connection change-over switches as follows. In the partitioned part Pa1, the NIC 121 and the corresponding LAN connector T1 are connected by the connection change-over switches SW01 and SW1. Further, the connection change-over switch SW2 connects the NIC 122 to the corresponding LAN connector T2. On the other hand, the connections of the connection change-over switches SW02, SW3 and SW4 included in the partitioned part Pa2 are not changed over. In the partitioned part Pa1, the power is supplied by the ordinary power source to the NIC 122 which has not been operated in the standby state. As a result, the two NICs, i.e., the NIC 121 and the NIC 122 in the partitioned part Pa1, are operated, and the two LAN connectors T1 and T2 are respectively connected to the NIC 121 and the NIC 122 via the connection change-over switches SW01, SW1 and SW2.

Therefore, the personal computers PC1 and PC2 connected to the two segments, i.e., the segments 21 and 22 related to the partitioned part Pa1, may be connected to the CPU 111 via the corresponding NICs, i.e., the NIC 121 and the NIC 122, and the bus interface switch 112. However, the NIC 124 in the other partitioned part Pa2 is not supplied with the power so as not to be operated. The power supply from the resident power source to the switching hub 128Y is maintained because the magic packet bound for the NIC 123 and the NIC 124 included in the other partitioned part Pa2 is received by the NIC 121 and is processed by the MMB 150.

With the Third Embodiment, an operation of sending the magic packet to any one of the two NICs, i.e., the NIC 123 and the NIC 124, included in the partitioned part Pa2 in the standby state is described. In this case, the magic packet is sent to the switching hub 128Y by the connection change-over switch SW3 or SW4. The switching hub 128Y carries out a similar determination to those in steps S3 and S4 illustrated in FIG. 7. If the received packet is the magic packet and is bound for any one of the two NICs, the NIC 123 and the NIC 124, the magic packet is sent to the operating NIC inside the partitioned part Pa2. At this time, if the destination of the magic packet is the NIC 123, the switching hub 128Y maintains the destination without changing it. If the destination of the magic packet is the NIC 124, the switching hub 128Y changes the destination to the NIC 123. As a result, the NIC 123 receives the magic packet in a similar manner to the First Embodiment, and sends a power-on signal to the MMB 150 with the function of the Wake-on LAN activation.

When the MMB 150 receives the power-on signal from the NIC 123, the MMB 150 starts initial setup of various boards of the information processing apparatus 100Y and activates the information processing apparatus 100Y in a similar manner to the First Embodiment. Then, the MMB 150 changes over the connections of the connection change-over switches as follows. In the partitioned part Pa2, the NIC 123 and the corresponding LAN connector T3 are connected by the connection change-over switches SW02 and SW3. Further, the connection change-over switch SW4 connects the NIC 124 to the corresponding LAN connector T4.

In the partitioned part Pa2, the power is supplied by the ordinary power source 132 to the NIC 124 which has not been operated in the standby state. As a result, the two NICs, i.e., the NIC 123 and the NIC 124 in the partitioned part Pa2, are operated, and the two LAN connectors T3 and T4 are connected to the respective NIC 124 and the NIC 123 via the connection change-over switches SW02, SW3 and SW4. Therefore, the personal computers PC1 and PC2 connected to the two segments, i.e., the segments 23 and 24 related to the partitioned part Pa2, may be connected to the CPU 111 via the corresponding NICs, i.e., the NIC 121 and the NIC 122, and the bus interface switch 112. However, the NIC 122 in the other partitioned part Pa1 is not supplied with the power so as not to be operated. The power supply from the resident power source 131 to the switching hub 128Y is maintained because the magic packet bound for the NIC 121 and the NIC 122 included in the other partitioned part Pa2 is received by the NIC 121 and processed by the MMB 150.

With Embodiment 3, a case where the information processing apparatus 100Y is activated with the Wake-on LAN by a first magic packet to the NIC included in any one of the partitioned parts Pa1 and Pa2 is assumed. In this case, when a second magic packet bound for the NICs in the other partition reaches the information processing apparatus 100Y, the following operations are done. The second magic packet is sent by the switching hub 128Y to the operating NIC included in the other partition and powered by the resident power source 131. As a result, the operating NIC receives the second magic packet, and sends a power-on signal to the MMB 150 with the function of the Wake-on LAN activation.

The information processing apparatus 100Y has already started the Wake-on LAN with the above-described first magic packet. Therefore, when the MMB 150 receives the power-on signal with the above described second magic packet, the MMB 150 changes over the connection change-over switch in the other partition as follows. Said differently, the two NICs are connected to the corresponding two LAN connectors in the other partition. Next, the MMB 150 stops to supply the resident power source to the switching hub 128Y. The MMB 150 starts to supply the power with the ordinary power source 132 to a NIC other than the operating NIC powered by the resident power source in the other partition. As a result, all of the four NICs, i.e., the NIC 121, the NIC 122, the NIC 123 and NIC 124, in the partitioned parts Pa1 and Pa2 operate with the supplied power. By connections of the connection change-over switches, the four NICs, i.e., the NIC 121, the NIC 122, the NIC 123 and the NIC 124, are connected to the respective four LAN connectors T1 to T4.

In the case of the Third Embodiment, the four NICs, i.e., the NIC 121, the NIC 122, the NIC 123 and the NIC 124, are partitioned two by two by the partitioned parts Pa1 and Pa2. As described above, a case where the magic packet bound for any one of the two NICs included in any one of the two partitioned parts Pa1 and Pa2 is sent to the information processing apparatus 100Y is assumed. As described, the magic packet is sent by the switching hub 128Y to the operating NIC included in the corresponding partition and powered by the resident power source 131. Said differently, the magic packet bound for the NIC in the partition is sent to the operating NIC in the same partition and is not sent to the NICs in the other partition.

As a result, with the Third Embodiment in comparison with the First Embodiment, the number of the NICs operated by the resident power source 131 in the standby state is one in each of the partitioned parts. Therefore, the total number of the NICs powered by the resident power source 131 in the standby state is two where less standby electricity may be consumed in the First Embodiment than the Third Embodiment. However, if it is sufficient to supply the power to only the two NICs in the four NICs in the standby state, it is possible to reduce consumption of a certain amount of the standby electricity in comparison with the example illustrated in FIG. 1. Further, the Third Embodiment has an effect that the destination of the magic packet may be partitioned by the partitioned parts and the magic packet is not sent to the other partition over the partition.

Figure 16:
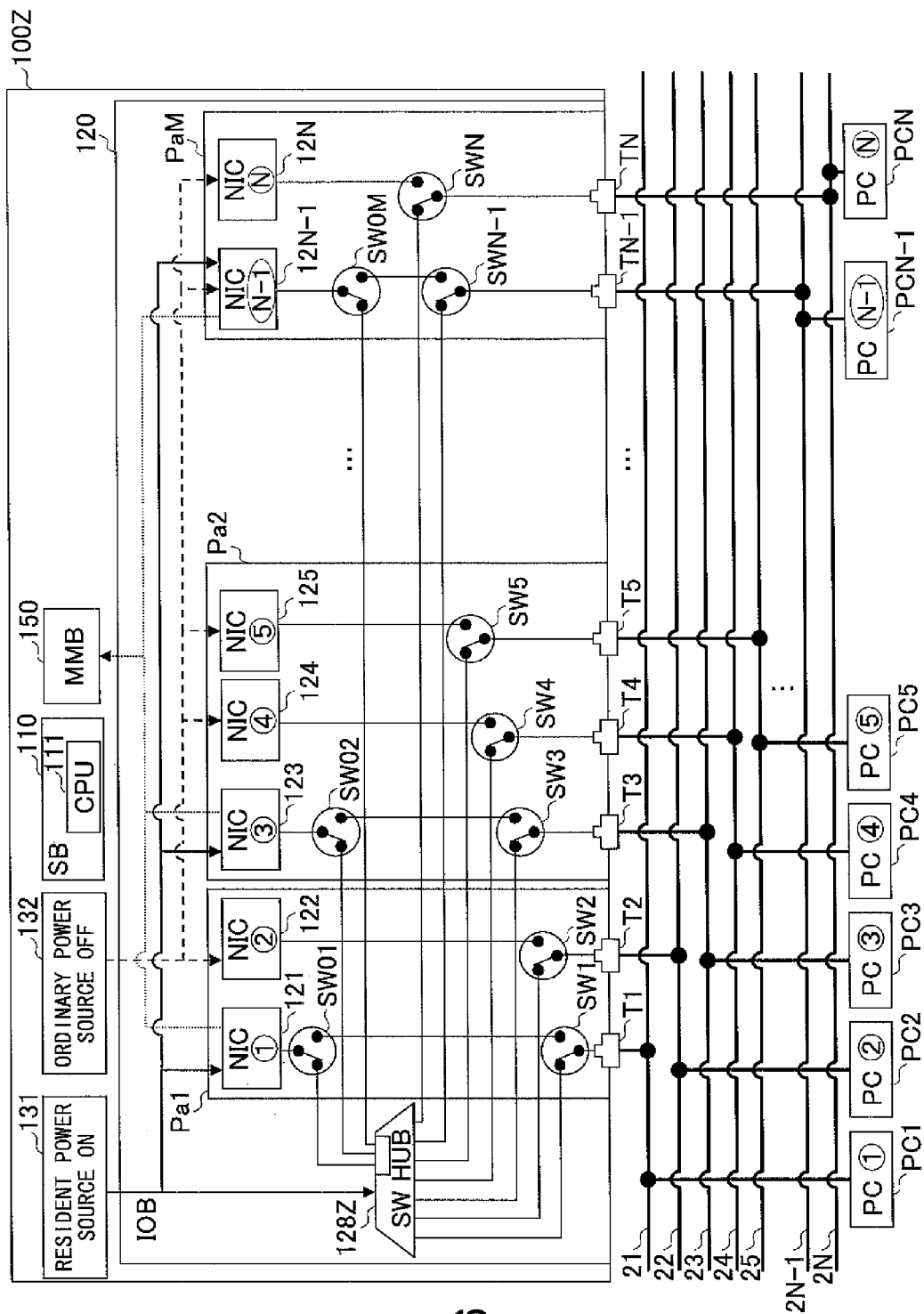
FIG. 16 is a block chart illustrating a structural example of activating PCs of a Fourth Embodiment.

FIG. 16 is a block chart of an information processing apparatus 100Z of a Fourth Embodiment.

In the information processing apparatuses 100Z of the Fourth Embodiment, the NICs as many as N, a NIC 121 to a NIC 12N are partitioned by partitioned parts Pa1, Pa2, . . . , PaM as many as M.

With the Fourth Embodiment, the two NICs, i.e., the NIC 121 and the NIC 122, are included in the partitioned part Pa1, the three NICs, i.e., the NIC 123, NIC 124 and NIC 125, are included in the partitioned part Pa2. The partitioned parts Pa3 to PaM-1 are further provided. The NIC 12N-1 and NIC 12N are included in the partitioned part PaM. With the Fourth Embodiment, the NIC 121 of the two NICs, i.e., the NIC 121 and the NIC 122 included in the partitioned part Pa1, is powered by the resident power source even if the NIC 121 is in the standby state. The other NIC 122 in the standby state is not operated without being supplied with the power. In a similar manner thereto, the NIC 123 of the three NICs, i.e., the NIC 123, NIC 124 and NIC 125 included in the partitioned part Pa2, is powered by the resident power source 131 even if the NIC 123 is in the standby state. The other NIC 124 and NIC 125 in the standby state are not operated without being supplied with the power. The other partitioned parts Pa3 to PaM-1 are similar. In a similar manner thereto, the NIC 12N-1 of the two NICs, i.e., the NIC 12N-1 and NIC 12N included in the partitioned part PaM is operated even if the NIC 123 is in the standby state. The other NIC 12N in the standby state is not operated without being supplied with the power.

With the Fourth Embodiment, connection change-over switches SW01, SW02, . . . , SW0M are provided for the respective NIC 121, NIC123, . . . , NIC12N-1 in the partitioned parts Pa1, Pa2, . . . , PaM, which are powered by the resident power source. As a result, with the Fourth Embodiment, the connection change-over switches, i.e., the connection change-over switches SW01, SW1 and SW2 (for the partitioned part Pa1), the connection change-over switches SW02, SW3, SW4 and SW5 (for the partitioned part Pa2) and the connection change-over switches SW0M, SWN-1 and SWN (for the partitioned part PaM) are provided as illustrated in FIG. 16.

In the partitioned part Pa1, the connection change-over switch SW01 connects the NIC 121 to the switching hub 128Z under the standby state. The connection change-over switches SW1 and SW2 connect the corresponding LAN connectors T1 and T2 to the switching hub 128Z. After activating the Wake-on LAN for the partitioned part Pa1, the MMB 150 carries out the following operation upon receipt of a power-on signal from the NIC 121. Said differently, the connection change-over switch SW01 connects the NIC 121 to the connection change-over switch SW1. The connection change-over switch SW1 connects the LAN connector T1 to the connection change-over switch SW01. Further, the connection change-over switch SW2 connects the corresponding LAN connector T2 to the corresponding NIC 122. As a result, the personal computer PC1 connected to the segment 21 corresponding to the NIC 121 in the partitioned part Pa1 is connected to the NIC 121 via the connection change-over switches SW1 and SW01. Meanwhile, the personal computer PC2 connected to the segment 22 corresponding to the NIC 122 in the partitioned part Pa1 is connected to the NIC 122 via the connection change-over switch SW2.

In the partitioned part Pa2, the connection change-over switch SW02 connects the NIC 123 to the switching hub 128Z under the standby state. The connection change-over switches SW3, SW4 and SW5 connect the corresponding LAN connectors T3, T4 and T5 to the switching hub 128Z. After activating the Wake-on LAN for the partitioned part Pa2, the MMB 150 carries out the following operation upon receipt of a power-on signal from the NIC 123. Said differently, the connection change-over switch SW02 connects the NIC 123 to the connection change-over switch SW3. The connection change-over switch SW3 connects the LAN connector T3 to the connection change-over switch SW02. Further, the connection change-over switch SW4 connects the corresponding LAN connector T4 to the corresponding NIC 124. Further, the connection change-over switch SW5 connects the corresponding LAN connector T5 to the corresponding NIC 125. As a result, the personal computer PC3 connected to the segment 23 corresponding to the NIC 123 in the partitioned part Pa2 is connected to the NIC 123 via the connection change-over switches SW3 and SW02. Meanwhile, the personal computer PC4 connected to the segment 24 corresponding to the NIC 124 in the partitioned part Pa2 is connected to the NIC 124 via the connection change-over switch SW4. Meanwhile, the personal computer PC5 connected to the segment 25 corresponding to the NIC 125 in the partitioned part Pa2 is connected to the NIC 125 via the connection change-over switch SW5.

The other partitioned parts Pa3 to PaM-1 are similar. In the partitioned part PaM, the connection change-over switch SW0M connects the NIC 12N-1 to the switching hub 128Z under the standby state. The connection change-over switches SWN-1 and SWN connect the corresponding LAN connectors TN-1 and TN to the switching hub 128Z. After activating the Wake-on LAN for the partitioned part PaM, the MMB 150 carries out the following operation upon receipt of a power-on signal from the NIC 12N-1. Said differently, the connection change-over switch SW0M connects the NIC 12N-1 to the connection change-over switch SWN-1. The connection change-over switch SWN-1 connects the LAN connector TN-1 to the connection change-over switch SW0M. Further, the connection change-over switch SWN connects the corresponding LAN connector TN to the corresponding NIC 12N. As a result, the personal computer PCN-1 connected to the segment 2N-1 corresponding to the NIC 12N-1 in the partitioned part PaM is connected to the NIC 12N-1 via the connection change-over switches SWN-1 and SW0M. Meanwhile, the personal computer PCN connected to the segment 2N corresponding to the NIC 12N in the partitioned part PaM is connected to the NIC 12N via the connection change-over switch SWN.

With the Fourth Embodiment, an operation of sending the magic packet to any one of the two NICs, i.e., the NIC 121 and the NIC 122, included in the partitioned part Pa1 in the standby state is described. In this case, the magic packet is sent to the switching hub 128Z by the two connection change-over switches SW1 and SW2. The switching hub 128Z determines in a similar manner to steps S3 and S4 illustrated in FIG. 7. The packet received as a result of the determination is a magic packet and the destination of the received packet is any one of the two NICs, i.e., the NIC 121 and the NIC 122, so that the switching hub 128Z sends the magic packet to the operating NIC 121 in the partitioned part Pa1. At this time, if the destination of the magic packet is the NIC 121, the switching hub 128Z maintains the destination without changing it. If the destination of the magic packet is the NIC 122, the switching hub 128Z changes the destination to the NIC 121. As a result, the NIC 121 receives the magic packet in a similar manner to the First Embodiment, and sends a power-on signal to the MMB 150 with the function of the Wake-on LAN activation.

When the MMB 150 receives the power-on signal from the NIC 121, the MMB 150 starts initial setup of various boards of the information processing apparatus 100Z and activates the information processing apparatus 100Z. Then, the MMB 150 changes over the connection of the connection change-over switch as follows. In the partitioned part Pa1, the NIC 121 and the corresponding LAN connector T1 are connected by the connection change-over switches SW01 and SW1. Further, the connection change-over switch SW2 connects the NIC 122 to the corresponding LAN connector T2. On the other hand, the connections of the connection change-over switches SW02, SW3 and SW4 included in the partitioned part Pa2 are not changed over. The connections of the connection change-over switches included in the partitioned parts Pa3 to PaM-1 are not changed over in a similar manner thereto. The connections of the connection change-over switches SW0M, SWN-1 and SWN included in the partitioned part PaM are not changed over. In the partitioned part Pa1, the power is supplied by the ordinary power source 132 to the NIC 122 which has not been operated in the standby state. As a result, the two NICs, i.e., the NIC 121 and the NIC 122 in the partitioned part Pa1, are operated, and the two LAN connectors T1 and T2 are connected to the respective NIC 121 and the NIC 122 via the connection change-over switches SW01, SW1 and SW2.

Therefore, the personal computers PC1 and PC2 connected to the two segments, i.e., the segments 21 and 22 related to the partitioned part Pa1, may be connected to the CPU 111 via the corresponding NICs, i.e., the NIC 121 and the NIC 122, and the bus interface switch 112. However, the NIC 124 and NIC 125 in the other partitioned part Pa2 are not supplied with the power so as not to be operated. The other partitioned parts Pa3 to PaM-1 are similar. The NIC 12N in the partitioned part PaM is not supplied with the power so as not to be operated. The power supply from the resident power source 131 to the switching hub 128Z is continuously maintained. This is because magic packets bound for the NIC 123 and the NIC 124 included in the other partitioned part Pa2, the NICs included in the other partitioned parts Pa3 to PaM-1, and the NIC 12N-1 and the NIC 12N included in the partitioned part PaM are received and processed using the NIC 121.

With the Fourth Embodiment, an operation of sending the magic packet to any one of the three NICs, i.e., the NIC 123, the NIC 124 and the NIC 125 included in the partitioned part Pa2, in the standby state is described. In this case, the magic packet is sent to the switching hub 128Z by the three connection change-over switches SW3, SW4 and SW5. The switching hub 128Z carries out a similar determination to those in steps S3 and S4 illustrated in FIG. 7. If the received packet is the magic packet and is bound for any one of the three NICs, i.e., the NIC 123, NIC 124 and the NIC 125, the magic packet is sent to the operating NIC 123 inside the partitioned part Pa2. At this time, if the destination of the magic packet is the NIC 123, the switching hub 128Z maintains the magic packet without changing the destination of the magic packet. If the destination of the magic packet is the NIC 124, the switching hub 128Z changes the destination of the magic packet to the NIC 123. If the destination of the magic packet is the NIC 125, the switching hub 128Z changes the destination of the magic packet to the NIC 123. As a result, the NIC 123 receives the magic packet, and sends a power-on signal to the MMB 150 with the function of the Wake-on LAN activation.

When the MMB 150 receives the power-on signal from the NIC 123, the MMB 150 starts initial setup of various boards of the information processing apparatus 100Z and activates the information processing apparatus 100Z. Then, the MMB 150 changes over the connections of the connection change-over switches as follows. In the partitioned part Pa2, the NIC 123 and the corresponding LAN connector T3 are connected by the connection change-over switches SW02 and SW3.

Further, the connection change-over switch SW4 connects the NIC 124 to the corresponding LAN connector T4. Further, the connection change-over switch SW5 connects the NIC 125 to the corresponding LAN connector T5.

In the partitioned part Pa2, the power is supplied by the ordinary power source 132 to the NIC 124 and the NIC 125 which have not been operated in the standby state. As a result, the three NICs, i.e., the NIC 123, the NIC 124 and the NIC 125 in the partitioned part Pa2, are operated, and the three LAN connectors T3, T4 and T5 are connected to the respective NIC 123, the NIC 124 and the NIC 125 via the connection change-over switches SW02, SW3, SW4 and SW5. Therefore, the personal computers connected to the three segments, i.e., the segments 23, 24 and 25 related to the partitioned part Pa2, may be connected to the CPU 111 via the corresponding NICs and the bus interface switch 112. However, the NIC 122 in the other partitioned part Pa1 is not supplied with the power so as not to be operated. The other partitioned parts Pa3 to PaM-1 are similar. The power is not supplied to the NIC 12N in the partitioned part PaM so as not to be operated. The power supply from the resident power source 131 to the switching hub 128Z is maintained because the magic packets bound for the NICs included in the other partitioned part Pa1, Pa3 to PaM are received by the NIC 121 and processed by the MMB 150.

With the Fourth Embodiment, an operation of sending the magic packet to any one of the NICs included in the partitioned parts Pa3 to PaM-1 in the standby state is described. An operation of sending the magic packet to any one of the two NICs, i.e., the NIC 12N-1 and the NIC 12N included in the partitioned part PaM in the standby state, is as follows. In this case, the magic packet is sent to the switching hub 128Z by the two connection change-over switches SWN-1 and SWN. The switching hub 128Z carries out a similar determination to those in steps S3 and S4 illustrated in FIG. 7. If the received packet is the magic packet and is bound for any one of the two NICs, i.e., the NIC 12N-1 and the NIC 12N, the magic packet is sent to the operating NIC 12N-1 inside the partitioned part PaM. At this time, if the destination of the magic packet is the NIC 12N-1, the switching hub 128Z maintains the destination without changing it. If the destination of the magic packet is the NIC 12N, the switching hub 128Z changes the destination to the NIC 12N-1. As a result, the NIC 12N-1 receives the magic packet, and sends a power-on signal to the MMB 150 with the function of the Wake-on LAN activation.

When the MMB 150 receives the power-on signal from the NIC 12N-1, the MMB 150 starts initial setup of various boards of the information processing apparatus 100Z and activates the information processing apparatus 100Z. Then, the MMB 150 changes over the connections of the connection change-over switches as follows. In the partitioned part PaM, the NIC 12N-1 and the corresponding LAN connector TN-1 are connected by the connection change-over switches SW0M and SWN-1. Further, the connection change-over switch SWN connects the NIC 12N to the corresponding LAN connector TN.

In the partitioned part PaM, the power is supplied by the ordinary power source 132 to the NIC 12N which has not been operated in the standby state. As a result, the two NICs, i.e., the NIC 12N-1 and the NIC 124N in the partitioned part Pa2, are operated, and the corresponding two LAN connectors TN-1 and TN are connected to the respective NIC 12N-1 and the NIC 12N via the connection change-over switches SW0M, SWN-1 and SWN. Therefore, the personal computers connected to the two segments, i.e., the segments 2N-1 and 2N related to the partitioned part PaM, may be connected to the CPU 111 via the corresponding NICs, i.e., the NIC 121 and the NIC 122, and the bus interface switch 112. However, the NIC 122 in the other partitioned part Pa1 is not supplied with the power so as not to be operated. The other partitioned parts Pa2 to PaM-1 are similar. The power supply from the resident power source 131 to the switching hub 128Z is maintained because the magic packets bound for the NICs included in the other partitioned parts Pa1 to PaM-1 are received by the NIC 121 and processed by the MMB 150.

With Embodiment 4, a case where the information processing apparatus 100Z is activated with the Wake-on LAN by a first magic packet to the NIC included in any one of the partitioned parts Pa1, Pa2, . . . , PaM is assumed. In this case, when a second magic packet bound for the NICs in the other partitioned parts reaches the information processing apparatus 100Z, the following operations are done. The second magic packet is sent by the switching hub 128Z to the operating NIC included in the other partition and powered by the resident power source 131. The operating NIC receives the second magic packet, and sends a power-on signal to the MMB 150 with the function of the Wake-on LAN activation.

The information processing apparatus 100Z has already started the Wake-on LAN with the above-described first magic packet. Therefore, when the MMB 150 receives the power-on signal with the above described second magic packet, the MMB 150 changes over the connection change-over switch in the other partitioned parts as follows. Said differently, the NICs are connected to the corresponding LAN connectors in the other partitioned parts by the connection change-over switches. Next, the MMB 150 stops supplying the resident power source to the switching hub 128Z. The MMB 150 starts to supply the power with the ordinary power source 132 to a NIC other than the operating NIC powered by the resident power source in the other partitioned parts. As a result, any of the NICs included in the two partitioned parts is supplied with the power and operated. The above two partitioned parts are partitioned parts which include the NIC being the destination of the first magic packet and the NIC being the destination of the second magic packet. With the connections of the connection change-over switches, the NICs included in the two partitioned parts are connected to the LAN connectors corresponding to the NICs. In this case, when a third magic packet bound for a NIC in the other partitioned parts reaches the information processing apparatus 100Z, the following operations are done.

The third magic packet is sent by the switching hub 128Z to the operating NIC which is included in further another partition and powered by the resident power source 131. The operating NIC receives the third magic packet, and sends a power-on signal to the MMB 150 with the function of the Wake-on LAN activation.

The information processing apparatus 100Z has already started the Wake-on LAN with the above-described first magic packet. Therefore, when the MMB 150 receives the power-on signal with the above described third magic packet, the MMB 150 changes over the connection change-over switch in the further other partition as follows. Said differently, the NICs are connected to the corresponding LAN connectors in the further other partitioned parts by the connection change-over switches. Next, the MMB 150 stops to supply the resident power source to the switching hub 128Z. The MMB 150 starts to supply the power with the ordinary power source 132 to a NIC other than the operating NIC powered by the resident power source in the further other partitioned parts As a result, the NICs included in the three partitioned parts are supplied with the power and operated. The above three partitioned parts are the partition having the NIC being the destination of the first magic packet, the other partition having the NIC being the destination of the second magic packet, and the further other having the NIC being the destination of the third magic packet. With the connections of the connection change-over switches, the NICs included in the three partitioned parts are connected to the LAN connectors corresponding to the NICs. Further, in the state, a fourth magic packet included in further another partition reaches the information processing apparatus 100Z, a similar operation is carried out.

In the case illustrated in FIG. 4, the plural NICs are partitioned by the plural partitioned parts Pa1, Pa2, . . . , PaM. As described above, a case where the magic packet bound for any one of the NICs included in any one of the partitioned parts i.e., the partitioned parts Pa1, Pa2 and PaM, is sent to the information processing apparatus 100Z is assumed. As described, the magic packet is sent by the switching hub 128Z to the operating NIC included in the corresponding partition part and powered by the resident power source 131. Said differently, the magic packet bound for the NIC in the partition part is sent to the operating NIC in the same partition and is not sent to the NICs in the other partitioned parts However, it is sufficient to supply the power to only the two NICs in the four NICs in the standby state, it is possible to reduce a certain amount of the standby electricity in comparison with the example illustrated in FIG. 1. Further, the Fourth Embodiment has an effect that the destination of the magic packet may be partitioned by the partitioned parts and the magic packet is not sent to the other partitioned parts over the partition.

Figure 17:
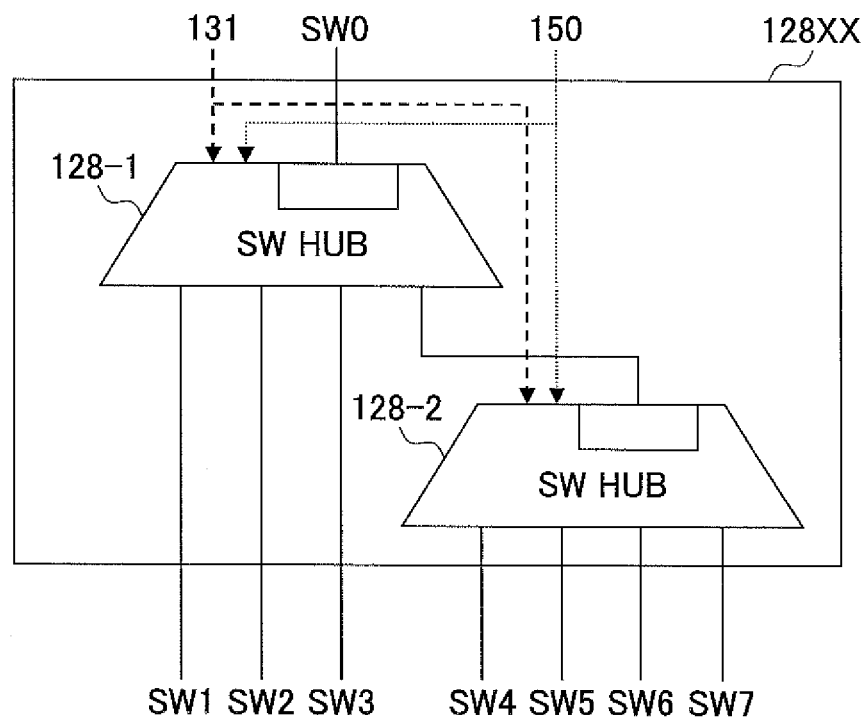
FIG. 17 illustrates an exemplary structure of the switching hubs.

Referring to FIG. 17, a case of using a group of switching hubs instead of the switching hub illustrated in FIG. 13 is described.

The number of ports of the switching hub 128X is N+1 as illustrated in FIG. 13. When the N increases, the number of the ports of the switching hub 128X becomes large. In this case, use of the switching hub having a great number of ports may become unrealistic. Therefore, when the N increases and the number of the ports of the switching hub 128X becomes great, it is possible to replace the switching hub 128X by a group of switching hubs 128XX. FIG. 17 illustrates the structure of an exemplary group 128XX of the switching hubs. Referring to FIG. 17, N is seven. Said differently, the number of the ports is eight.

The group 128XX of the switching hubs may include two switching hubs 128-1 and 128-2. The number of the ports of each of the switching hubs 128-1 and 128-2 is five. The switching hubs have structures as illustrated in FIG. 5. As illustrated in FIG. 17, the connection change-over switches SW0, SW1, SW2 and SW3 and the switching hub 128-2 are connected to the switching hub 128-1. The connection change-over switches SW4, SW5, SW6 and SW7 and the switching hub 128-1 are connected to the switching hub 128-2. The switching hubs 128-1 and 128-2 are controlled by the MMB 150 so as to integrally function as the group of the switching hubs in a similar manner to the switching hub 128X illustrated in FIG. 13.

Although the group 128XX of the switching hubs 128-1 and 128-2 includes two switching hubs 128-1 and 128-2, the group is not limited to the structure and may include three or more switching hubs. In this case also in a similar manner to FIG. 17, the switching hubs included in the group of the switching hubs may work together to function in a similar manner to the switching hub 128X illustrated in FIG. 13 under the control of the MMB 150. Further, in the Fourth Embodiment illustrated in FIG. 16, in a similar manner to the Second Embodiment illustrated in FIG. 13, the switching hub 128Z may be replaced by a group of two or more switching hubs.

According to embodiments, by controlling first to third selecting units, it is possible to connect a first input and output port to a first line connecting device via a switching unit and connect a second input and output port to the first line connecting device via the switching unit. Further, by controlling the first to third selecting units, the first and second input and output ports are connected to the first and second line connecting devices without intervening by the switching units. Under a standby state, the first input and output port is connected to the first line connecting device via the switching unit by controlling the first to third selecting units. Further, the second input and output port may be connected to the first line connecting device via the switching unit. As a result, any one of the activating commands sent from any one of the first and second terminal devices may be received by the first line connecting device via a corresponding one of the first or second input and output port. Therefore, the standby electricity may be supplied only to the first line connecting device. Further, by controlling the first to third selecting units after activating a processing apparatus, the first and second input and output ports are respectively connected to the first and second line connecting devices without intervening by the switching units. Therefore, the standby electricity may be effectively reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing apparatus comprising:
a processing device configured to process data;
a first line connecting device configured to be connected to the processing device;
a second line connecting device configured to be connected to the processing device;
a first input and output port configured to be connected to a first end device via a first line;
a second input and output port configured to be connected to a second end device via a second line;
a first selecting unit that includes a first terminal, a second terminal and a third terminal, the first terminal being connected to the first line connecting device and either the second terminal or the third terminal;
a second selecting unit that includes a fourth terminal, a fifth terminal and a sixth terminal, the fourth terminal being connected to the first input and output port, the fifth terminal being connected to the second terminal, the fourth terminal being connected to either the fifth terminal or the sixth terminal;
a third selecting unit that includes a seventh terminal, a eighth terminal and a ninth terminal, the seventh terminal being connected to the second input and output port, the eighth terminal being connected to the second line connecting device, the seventh terminal being connected to either the eighth terminal or the ninth terminal; and a switching unit that includes a tenth terminal, a eleventh terminal and a twelfth terminal, the tenth terminal being connected to the third terminal, the eleventh terminal being connected to the sixth terminal, the twelfth terminal being connected to the ninth terminal, the tenth terminal being connected to either the eleventh terminal or the twelfth terminal.

2. The information processing apparatus according to claim 1, further comprising:
a management device configured to control the first selecting unit, the second selecting unit and the third selecting unit to be either a first connected state or a second connected state,
wherein, in the first connected state, the first terminal is connected to the third terminal, the fourth terminal is connected to the sixth terminal, and the seventh terminal is connected to the ninth terminal, and
in the second connected state, the first terminal is connected to the second terminal, the fourth terminal is connected to the fifth terminal, and the seventh terminal is connected to the eighth terminal.

3. The information processing apparatus according to claim 1,
wherein the first line connecting device is supplied with power in a standby state of the processing device, and
the second line connecting device is not supplied with the power in the standby state of the processing device.

4. The information processing apparatus according to claim 2,
wherein the first line connecting device activates the management device to cause the management device to be in the second connected state when first line connecting device receives an activating command from the first end device or the second end device under the first connected state.

5. The information processing apparatus according to claim 4,
wherein the first line connecting device activates the management device to cause the management device to supply the power to the second line connecting device when the first line connecting device receives the activating command from the first end device or the second end device under the first connected state.

6. A control method of an information processing apparatus that includes a processing device configured to process data, a first line connecting device configured to be connected to the processing device, a second line connecting device configured to be connected to the processing device, a first input and output port configured to be connected to a first end device via a first line, a second input and output port configured to be connected to a second end device via a second line, and a switching unit configured to establish a connected state between the first line connecting device, the second line connecting device, the first input and output port, and the second input and output port, the control method comprising:
establishing a first connected state, in which the management device controls a first selecting unit, a second selecting unit and a third selecting unit to connect the first or second input and output port to the first line connecting device by connecting the switching unit to the first and second input and output ports and connecting the switching unit to the first line connecting device, the first selecting unit being connectable to the first line connecting device and the switching unit, the second selecting unit being connectable to the first input and output port, the first selecting unit and the switching unit, the third selecting unit being connectable to the second input and output port, the second line connecting device and the switching unit; and
establishing a second connected state, in which the management device controls the first selecting unit, the second selecting unit and the third selecting unit to connect the first input and output port to the first line connecting device and to connect the second input and output port to the second line connecting device.

7. The control method according to claim 6, further comprising:
supplying the first line connecting device with power in a standby state of the processing device, and
not supplying the second line connecting device with power in the standby state of the processing device.

8. The control method according to claim 6, further comprising:
activating, by the first line connecting device, the management device to cause the management device to be in the second connected state when first line connecting device receives an activating command from the first end device or the second end device under the first connected state.

9. The control method according to claim 8, further comprising:
activating, by the first line connecting device, the management device to cause the management device to supply the power to the second line connecting device when the first line connecting device receives the activating command from the first end device or the second end device under the first connected state.

* * * * *